US006996802B2

(12) United States Patent
de Jong

(10) Patent No.: US 6,996,802 B2
(45) Date of Patent: Feb. 7, 2006

(54) METHOD AND APPARATUS FOR DEPLOYMENT OF HIGH INTEGRITY SOFTWARE USING INITIALIZATION ORDER AND CALLING ORDER CONSTRAINTS

(75) Inventor: Eduard de Jong, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 481 days.

(21) Appl. No.: 10/101,296

(22) Filed: Mar. 18, 2002

(65) Prior Publication Data

US 2003/0177475 A1 Sep. 18, 2003

(51) Int. Cl.
G09F 9/44 (2006.01)
(52) U.S. Cl. .................. 717/107; 717/118; 717/126
(58) Field of Classification Search ........ 717/101–126, 717/136–139
See application file for complete search history.

(56) References Cited

U.S. PATENT DOCUMENTS

| | | | |
|---|---|---|---|
| 4,734,568 A | 3/1988 | Watanabe | 235/487 |
| 5,107,418 A | 4/1992 | Cramer et al. | 717/155 |
| 5,384,749 A | 1/1995 | Lisart et al. | 365/230.01 |
| 5,423,027 A | 6/1995 | Jackson | |
| 5,615,137 A | 3/1997 | Holzmann et al. | 703/17 |
| 5,650,948 A | 7/1997 | Gafter | 716/3 |
| 5,659,754 A | 8/1997 | Grove et al. | 717/158 |
| 5,668,999 A | 9/1997 | Gosling | 717/126 |
| 5,740,441 A | 4/1998 | Yellin et al. | 717/130 |
| 5,748,964 A | 5/1998 | Gosling | 717/126 |
| 5,790,859 A | 8/1998 | Sarkar | 717/130 |
| 5,802,519 A | 9/1998 | de Jong | 707/100 |
| 5,836,014 A | 11/1998 | Faiman, Jr. | 717/156 |
| 5,887,161 A | 3/1999 | Cheong et al. | 712/244 |
| 5,968,169 A | 10/1999 | Pickett | 712/239 |
| 5,974,255 A | 10/1999 | Gossain et al. | 717/124 |
| 6,038,397 A | 3/2000 | Iwanishi et al. | 717/154 |
| 6,052,690 A | 4/2000 | de Jong | 707/101 |
| 6,094,656 A | 7/2000 | de Jong | 707/100 |
| 6,282,700 B1 | 8/2001 | Grover et al. | 717/170 |
| 6,292,874 B1 | 9/2001 | Barnett | 711/153 |

(Continued)

FOREIGN PATENT DOCUMENTS

EP 0 390 339 10/1990

(Continued)

OTHER PUBLICATIONS

Hartel et al., "Formalizing the Safety of Java, the Java Virtual Machine, and Java Card", ACM, pp. 517-558, Dec. 2001.*

(Continued)

*Primary Examiner*—Ted T. Vo
(74) *Attorney, Agent, or Firm*—Gunnison, McKay & Hodgson, L.L.P.; Forrest Gunnison

(57) ABSTRACT

A method for designing a software program including multiple modules includes defining an initialization sequence wherein each of the modules is initialized according to a predetermined order. The method also includes defining calling order constraints wherein a first module may call a second module if the first module succeeds the second module in the allowed order. The method also includes creating a program specification for the software program. The program specification includes a module specification for each of the modules and each module specification indicates other modules called by an implementation of the module. According to one aspect, one of a plurality of initialization sequences is selected based upon the presence of one or more markers in a memory.

92 Claims, 17 Drawing Sheets

U.S. PATENT DOCUMENTS

| | | |
|---|---|---|
| 6,349,344 B1 | 2/2002 | Sauntry et al. ............. 719/332 |
| 6,463,581 B1 | 10/2002 | Bacon et al. ............... 717/154 |
| 6,526,571 B1 | 2/2003 | Aizikowitz et al. ......... 717/154 |
| 6,604,190 B1 | 8/2003 | Tran ........................... 712/207 |
| 6,684,261 B1 | 1/2004 | Orton et al. ................. 719/328 |
| 6,718,485 B1 | 4/2004 | Reiser .......................... 714/38 |
| 6,735,758 B1 | 5/2004 | Berry et al. ................ 717/130 |
| 2002/0019969 A1 | 2/2002 | Hellestrand et al. |
| 2002/0097269 A1 | 7/2002 | Batcha et al. |
| 2002/0147903 A1 | 10/2002 | Hubert et al. |
| 2003/0097581 A1 | 5/2003 | Zimmer |
| 2004/0015920 A1 | 1/2004 | Schmidt |
| 2004/0103416 A1 | 5/2004 | Orton et al. |

FOREIGN PATENT DOCUMENTS

| | | |
|---|---|---|
| EP | 0 543 588 | 5/1993 |
| EP | 0 605 872 A1 | 7/1994 |
| EP | 0 751 458 A1 | 1/1997 |
| EP | 0 821 305 A2 | 1/1998 |
| EP | 1 056 002 | 11/2000 |
| FR | 2 806 813 | 3/2000 |
| WO | 94/24673 | 10/1994 |
| WO | 98/19237 | 7/1998 |
| WO | 99/24944 | 5/1999 |

OTHER PUBLICATIONS

Qian et al., "A Formal Specification of Java™ Class Loading", CiteSeer, pp. 1-47, Jul. 2000.*

Cap et al., "Extending the data storage capabilities of a Java-based smartcard", IEEE, pp. 680-685, Jul. 2001.*

Chan, "Infrastructure of Multi-Application Smart Card", http://home.hkstar.com/~alanchan/papers/multiApplicationSmartCard/, Jul. 25, 2002.

Chen, Zhiqun, "Java Card™ Technology for Smart Cards", *Sun Microsystems*, pp. 11-16, Jun., 2000.

Philips Semiconductor, "Designers offered first 16-bit smart card IC architecture with development tools", Press Release, Jul. 25, 2002.

Ritchey, Tim, "Advanced Topics: The Java Virtual Machine", *Java!*, Chapter 14, pp. 25-346, Sep. 22, 1995.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

"Sun Delivers On Vision to Bring JAVA Technology to the Consumer and Embedded Market", Business Wire, Sep. 28, 1999.

"Sun Microsystems Announces JAVACARD API", Business Wire, Oct. 1996.

Sun Microsystems: "Sun's JAVA Technology Leads Open Worldwide Market for Smart Cards", M2, Presswire, May 1999.

Dean, Jeffrey, "ProfileMe: Hardware Support for Instruction-Level Profiling on Out-of-Order Processors", *IEEE* 1072-451/97.

Dolby, Julian, "Automatic Inline Allocation of Objects", Concurrent Systems Architecture Group, Department of Computer Science, University of Illinois.

Zhao, Jianjun "Applying Program Dependence Analysis to Java Software" Fukuoka Kogyo Daigaku Kenkyu Ronshu (Research Bulletin of Fukuoka Institute of Technology), vol. 31, No. 1, pp. 29-41 1998.

"Memory Corruption Debugging System", IBM Technical Disclosure Bulletin, IBM Corp., N.Y., Jan. 1, 1995, XP000498811, vol. 38, No. 1, pp. 395-400.

"Pseudo-Dynamic Algorithm for Computer Memory Allocation", IBM Technical Disclosure Bulletin, IBM Corp., N.Y., Sep. 1, 1993, vol. 36, No. 9A, XP000396177, pp. 597-599.

A. Johan Cockx, "Whole Program Comilation for Embedded Software: The ADSL Experiment", Apr. 25-27, 2001, pp. 214-218.

International Search Report, PCT/FR 03/08508, International filing date Mar. 17, 2003.

International Search Report, PCT/FR 03/08506, International filing date Mar. 17, 2003, Search Report mailed Mar. 17, 2004.

Allen, et al., "A Program Data Flow Analysis Procedure", Mar. 76', Comm. of the ACM, vol. 19, No. pp. 137-147.

Back, G. et al., "Java Operating Systems", Design and Implementation, Technical Report UUCS-98-015, Online!, Aug. 6, 1998, Dept. of Computer Science, Univ. of Utah, US (located at http://www.cs-tr.cornell.edu:80/Dienst/UI/1.0/Display/ncstrl.utahcs/UUCS098-015).

Dreifus, H., Smart Cards; A Guide to Building and Managing Smart Card Applications; Copyright 1998; Publisher Robert Ipsen' "Smart Card Development Skills, Methods, and Tools"; pp. 159-176; 224-225.

Hecht, et al., "A Simple Algorithm for Global Data Flow Analysis Problems", Dec. 1975, SIAM Journal of Computing, vol. 4, No. 4, pp. 519-532.

Heiss, J. et al., "Java Card™ Technology Grows Up Smart", printed on Apr. 22, 2000 at http://java.sum.com/features/1990/01/javacard.html, 5 pages.

Helaihel, et al., "Java as a Specification Language for Hardware-Software Systems", IEEE 1997 (0-89791-993), pp 8.

Kennedy, K., "A Global Flow Analysis Algorithm", 71', Intl. Journal of Comp. Math Sect. A., vol. 3, pp. 5-15.

Thomas David, J., "Smart and Smarter: The Emergence of Java Card™ Technology", printed on Apr. 22, 2000 from http://java/sun.com/features/1998/04/javacard.html, pp 1-8.

Sun Microsystems, Inc., "Java TM Card TM Runtime Environment (JCRE) 2.1 Specification-Draft 2", printed Dec. 4, 1998m YS XO002138793 cited in the application p. 6-2 p. 6-10.

Sun Microsystems, Inc., "Smart Cards: A primer", printed on Apr. 22, 2000 from http://www.javaworld.com/javaworld/jw-12-19_b97/f_jw-12-javadev_p.html, pp. 1-13.

Sun Microsystems, Inc., "Java Card™ 2.1 Runtime Environment (JCRE) Specification", Jun. 7, 1999, Final Revision 1.1.

Aho, et al., Code Optimization, Mar. 1988, Compilers-Principles, Techniques, and Tools, Addison-Wesley Publishing Co., Chapter 10, pp. 585-722.

Togethersoft Corporation, "Together Documentation Set: Together Getting Started Guide version 4.2", *Online Manual*, p. 26, lines 1-4, [Online] 2000. (XP002292559).

Attali, I. et al., "Smart Tools for Java Cards", *Fourth Working Conference on Smart Card Research and Advanced Applications Bristol UK*, pp. 155-174, [Online] Sep. 20, 2000. (XP002292560).

Martin, H. et al., "Automatic Test Generation for Java-Card Applets", *Java on Smart Cards Programming and Security, Cannes, France*, pp. 121-136 , [Online] Sep. 14, 2000. (XP002292561).

Aho, A. et al., "Compilers Principles, Techniques, and Tools", Addison-Wesley Publishing Co, US, pp. 1-646, 1986. (XP002941830).

Vendicator, "Stack Shield Technical Info File v0.7", paragraph 5, [Online] Jan. 7, 2000. (XP002292774).
Chiueh, T. et al., "RAD: A Compile-Time Solution to Buffer Overflow Attacks", *IEEE 21st International Conference on Distributed Computing Systems, Phoenix, AZ, USA*, pp. 409-417, [Online] Apr. 16, 2001. (XP002292775).

Baentsch, M. et al., "Javacard—From Hype to Reality", *IEEE Concurrency*, vol. 7, No. 4, IEEE Service Center, Piscataway, NY, US, pp. 36-43, Oct. 1999. (XP000873322).

* cited by examiner

METHOD AND APPARATUS FOR DEPLOYMENT OF HIGH INTEGRITY SOFTWARE USING INITIALIZATION ORDER AND CALLING ORDER CONSTRAINTS

CROSS REFERENCE TO RELATED APPLICATIONS

This application is related to the following:

U.S. patent application Ser. No. 10/101,289, filed Mar. 18, 2002 in the name of Eduard de Jong, entitled "Method and Apparatus for Deployment of High Integrity Software Using Reduced Dynamic Memory Allocation", commonly assigned herewith.

U.S. patent application Ser. No. 10/100,838, filed Mar. 18, 2002 in the name of Eduard de Jong and Pieter Hartel, entitled "Method and Apparatus for Deployment of High Integrity Software Using Static Procedure Return Addresses", commonly assigned herewith.

U.S. patent application Ser. No. 10/101,290, filed Mar. 18, 2002 in the name of Eduard de Jong, entitled "Enhanced Memory Management for Portable Devices", commonly assigned herewith.

FIELD OF THE INVENTION

The present invention relates to the field of computer science. More particularly, the present invention relates to a method and apparatus for deployment of high integrity software using initialization order and calling order constraints.

BACKGROUND OF THE INVENTION

High integrity software is software that must be trusted to work dependably in some critical function, and whose failure to do so may have catastrophic results, such as serious injury, loss of life or property, business failure or breach of security. Some examples include software used in safety systems of nuclear power plants, medical devices, electronic banking, air traffic control, automated manufacturing, and military systems. The importance of high quality, low defect software is apparent in such critical situations. However, high integrity software is also important in more mundane business areas where defective software is often the norm.

Formal verification is the process of checking whether a design satisfies some requirements or properties. In order to formally verify a design, it must first be converted into a more condensed, verifiable format. The design is specified as a set of interacting systems, each having a finite number of configurations or states. States and transition between states constitute finite state machines (FSMs). The entire system is a FSM that can be obtained by composing the FSMs associated with each component. The first step in verification consists of obtaining a complete FSM description of the system. Given a present state (or current configuration), the next state (or successive configuration) of a FSM can be written as a function of its present state and inputs (transition function or transition relation). Formal verification attempts to execute every possible computational path with every possible state value to prove every possible state is consistent.

FIG. 1 is a flow diagram that illustrates a typical method for writing, compiling and executing a software program. At 100, a software program including multiple modules is written using a particular programming language. Each module includes one or more procedures. The programming language defines allowable procedure calling relationships. At 105, the software program is compiled. At 110, the software program is executed. During program execution, each procedure is potentially capable of calling any procedure in the program where allowed by the programming language. Thus, programs with a small number of procedures can potentially have a relatively large state space subject to program verification. This complicates proving program correctness. Moreover, the difficulty of proving program correctness typically increases during the software development cycle as the complexity of a program increases.

A virtual machine is an abstract computing machine generated by a software application or sequence of instructions that is executed by a processor. The term "architecture-neutral" refers to programs, such as those written in the Java™ programming language, which can be executed by a virtual machine on a variety of computer platforms having a variety of different computer architectures. Thus, for example, a virtual machine implemented on a Windows™-based personal computer system will execute an application using the same set of instructions as a virtual machine implemented on a UNIX™-based computer system. The result of the platform-independent coding of a virtual machine's sequence of instructions is a stream of one or more bytecodes, many of which are, for example, one-byte-long numerical codes.

The Java™ programming language is an object-oriented programming language. In an object-oriented system, a "class" describes a collection of data and methods that operate on that data. Taken together, the data and methods describe the state of and behavior of an object. Use of the Java™ programming language has found many applications including, for example, those associated with Web browsers. The Java™ programming language is described in detail in Gosling, et al., "The Java™ Language Specification", August 1996, Addison-Wesley Longman, Inc. Programs written in the Java™ language execute on a virtual machine.

A Java™ virtual machine (JVM) executes virtual machine code written in the Java™ programming language and satisfies the Java™ Virtual Machine Specification (Lindholm, et al., "The Java™ Virtual Machine Specification", April 1999, Addison-Wesley Longman, Inc., Second Edition). A Java™ virtual machine (JVM) is an abstract computer architecture that can be implemented in hardware or software. Either implementation is intended to be included in the following description of a VM. For the purposes of this disclosure, the term "processor" may be used to refer to a physical computer or a virtual machine.

A Java™ virtual machine executes programs written in the Java™ programming language and is designed for use on desktop computers, which are relatively rich in memory. However, various devices have relatively limited architectures. Resource-constrained devices are generally considered to be those that are relatively restricted in memory and/or computing power or speed, as compared to typical desktop computers and the like. Other resource-constrained devices include, by way of example, smart cards, cellular telephones, boundary scan devices, field programmable devices, personal digital assistants (PDAs) and pagers and other miniature or small footprint devices.

Smart cards are typically made of plastic or metal and have an electronic chip that includes an embedded microprocessor or microcontroller to execute programs and memory to store programs and data. Such devices, which can be about the size of a credit card, typically have computer chips with 8-bit or 16-bit architectures. Additionally, these devices typically have limited memory capacity. For example, some smart cards have less than one kilobyte (1K) of random access memory (RAM) as well as limited read only memory (ROM), and/or non-volatile memory such as electrically erasable programmable read only memory (EEPROM).

It would be desirable to write programs that use the full implementation of the Java™ virtual machine for execution on resource-constrained devices such as smart cards. However, due to the limited architecture and memory of resource-constrained devices such as smart cards, the full Java™ virtual machine platform cannot be implemented on such devices. Accordingly, a separate Java Card™ (the smart card that supports the Java™ programming language) technology supports a subset of the Java™ programming language for resource-constrained devices.

The Java Card™ runtime environment (JCRE) consists of Java Card™ system components that run inside a smart card. The JCRE is responsible for card resource management, network communications, applet (user applications on the Java Card™ platform) execution and on-card system and applet security. It essentially serves as a smart card operating system.

As illustrated in FIG. 2, the JCRE 205 sits on top of the smart card hardware and native system 200. The JCRE 205 includes the Java Card™ virtual machine (the byte-code interpreter) 215, the Java Card™ application framework classes (APIs) 250, industry-specific extensions 255 and the JCRE system classes 225.

The bottom layer of the JCRE 205 contains the Java Card™ virtual machine (JCVM) 215 and native methods 220. The JCVM 215 executes bytecodes, controls memory allocation, manages objects and enforces runtime security. The Java Card™ interpreter provides runtime support of the Java™ language model. The native methods 220 provide support to the JCVM 215 and the next-layer system classes 225. They are responsible for handling functions such as low-level communication protocols, memory-management and cryptographic support.

The system classes 225 act as the JCRE executive. They are analogues to an operating system core. The system classes 225 are responsible for making transactions (235), managing communication between the host applications and Java Card™ applets (240) and controlling applet creation, selection and deselection (230).

The Java Card™ application framework defines the APIs. Applets 210 access the JCRE services through APIs. Applets 210 are written in the subset of the Java™ programming language and controlled and managed by the JCRE 205. Applets 210 are downloadable and can be added to a Java Card™ technology-enabled smart card after it has been manufactured.

What is needed is a method and apparatus for deployment of high integrity software that simplifies program verification. A further need exists for such a solution that simplifies program verification of software developed for resource constrained devices such as smart cards. Yet a further need exists for such a solution that simplifies program verification of software developed for a Java Card™ technology-enabled device.

SUMMARY OF THE INVENTION

A method for designing a software program including multiple modules includes defining an initialization sequence wherein each of the modules is initialized according to a predetermined order. The method also includes defining calling order constraints wherein a first module may call a second module if the first module succeeds the second module in the allowed order. The method also includes creating a program specification for the software program. The program specification includes a module specification for each of the modules and each module specification indicates other modules called by an implementation of the module. According to one aspect, one of a plurality of initialization sequences is selected based upon the presence of one or more markers in a memory.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
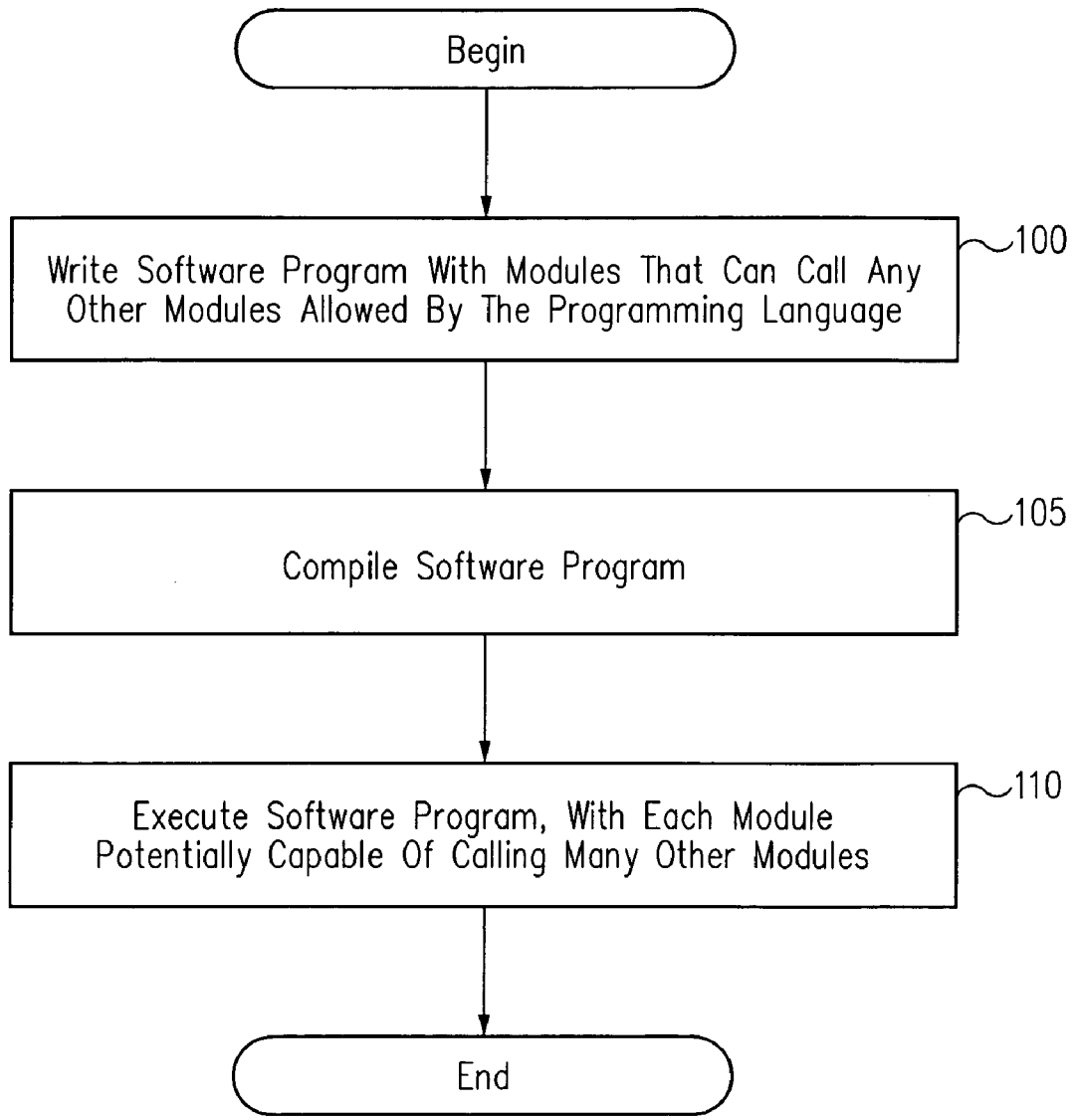
FIG. 1 is a flow diagram that illustrates a typical method for writing, compiling and executing a software program.
Figure 2:
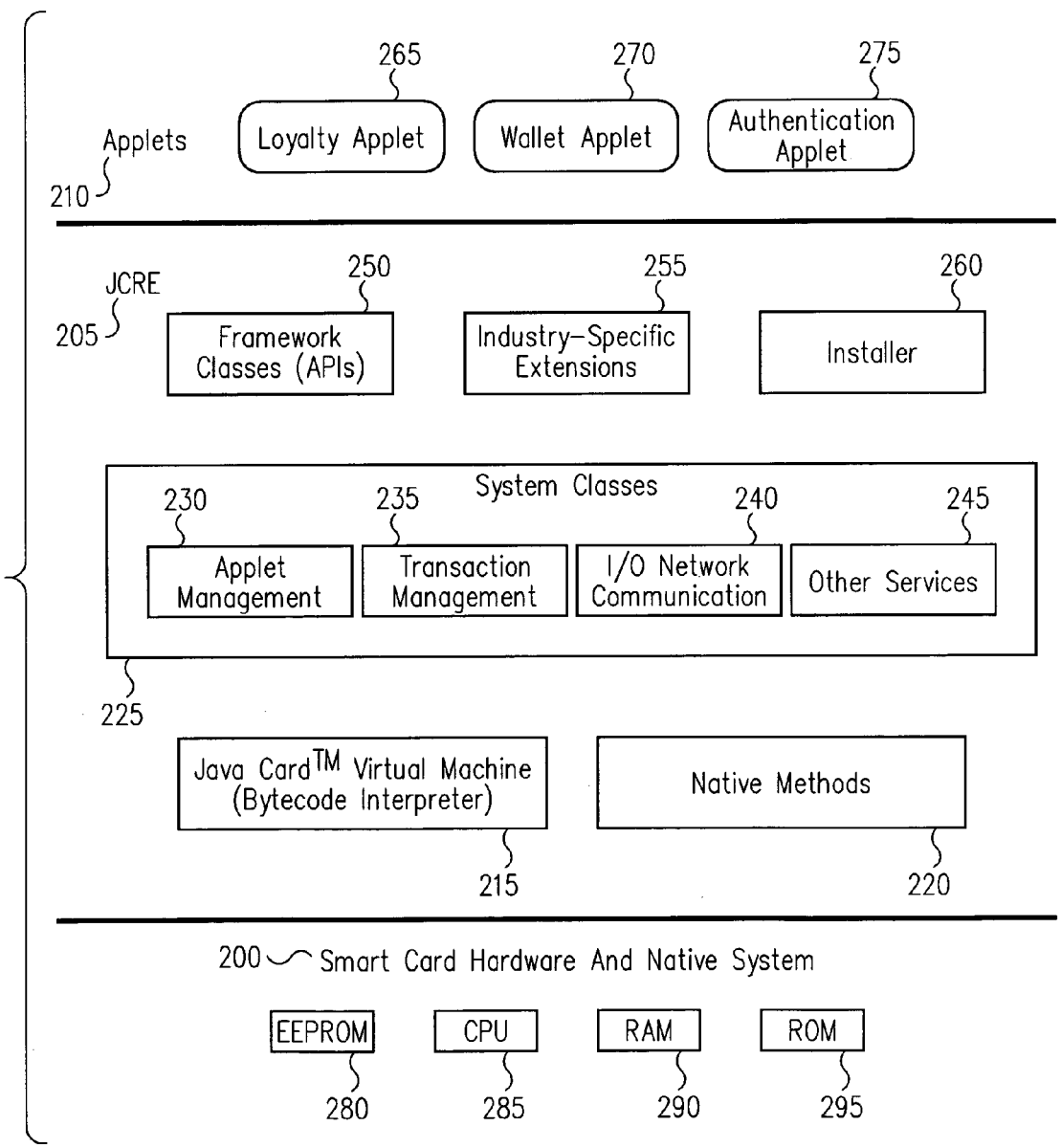
FIG. 2 is a block diagram that illustrates a Java Card™ technology-enabled smart card system architecture.

Embodiments of the present invention are described herein in the context of a method and apparatus for deployment of high integrity software using initialization order and calling order constraints. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Palo Alto, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

According to embodiments of the present invention, initialization order constraints and corresponding calling order constraints are imposed upon a software design, simplifying program verification by reducing the state space subject to program verification. The calling order constraints specify that a module may call another module only if the calling module succeeds the called module in the module initialization sequence.

Figure 3:
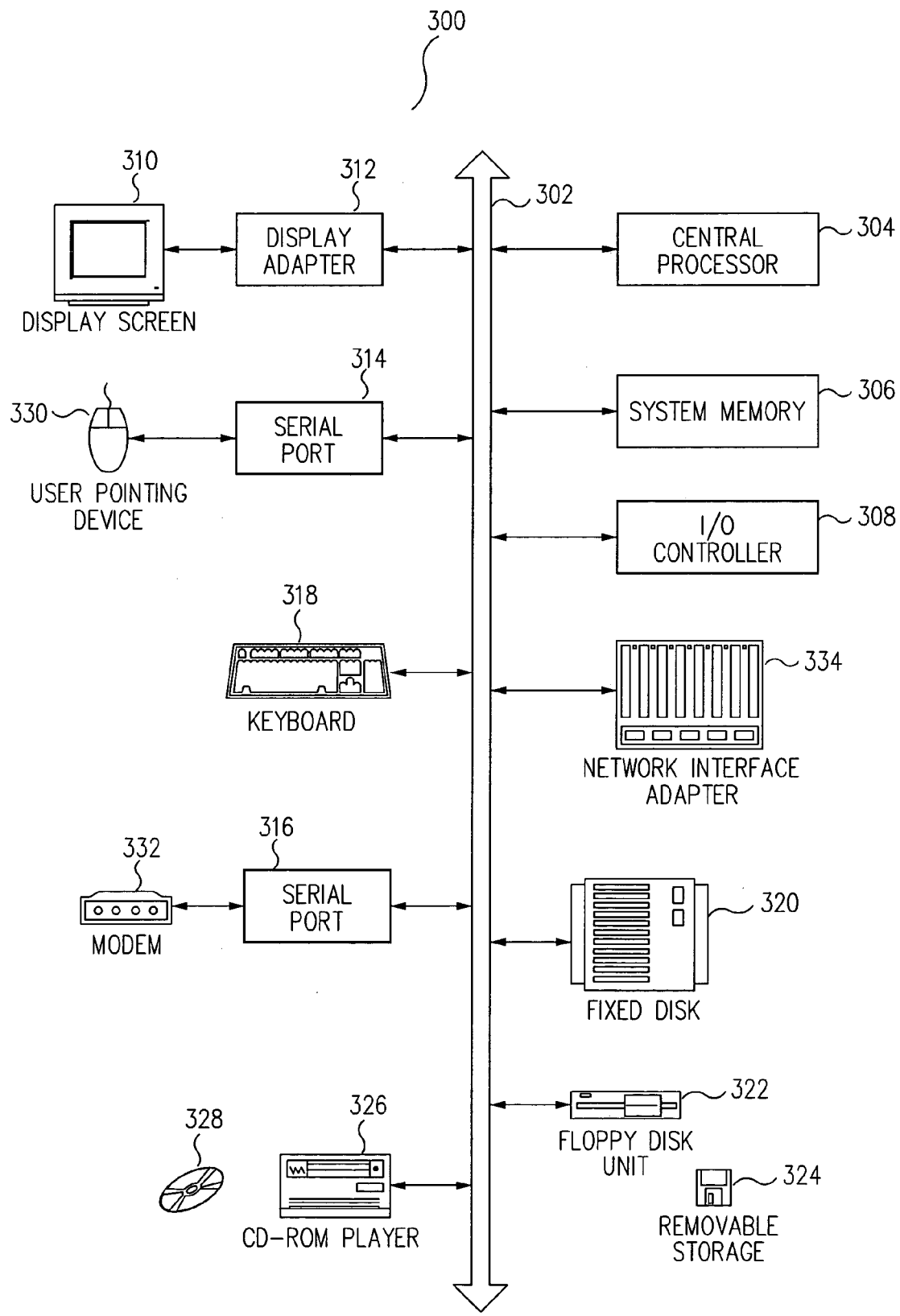
FIG. 3 is a block diagram of a computer system suitable for implementing aspects of the present invention.

FIG. 3 depicts a block diagram of a computer system 300 suitable for implementing aspects of the present invention. As shown in FIG. 3, computer system 300 includes a bus 302 which interconnects major subsystems such as a central processor 304, a system memory 306 (typically RAM), an input/output (I/O) controller 308, an external device such as a display screen 310 via display adapter 312, serial ports 314 and 316, a keyboard 318, a fixed disk drive 320, a floppy disk drive 322 operative to receive a floppy disk 324, and a CD-ROM player 326 operative to receive a CD-ROM 328. Many other devices can be connected, such as a pointing device 330 (e.g., a mouse) connected via serial port 314 and a modem 332 connected via serial port 316. Modem 332 may provide a direct connection to a remote server via a telephone link or to the Internet via a POP (point of presence). Alternatively, a network interface adapter 334 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 3 to be present to practice the present invention, as discussed below. Furthermore, the devices and subsystems may be interconnected in different ways from that shown in FIG. 3. The operation of a computer system such as that shown in FIG. 3 is readily known in the art and is not discussed in detail in this application, so as not to overcomplicate the present discussion. Code to implement the present invention may be operably disposed in system memory 306 or stored on storage media such as fixed disk 320, floppy disk 324 or CD-ROM 328.

For purposes of the present disclosure, a program specification refers to a model of a program design, expressed in terms of a strictly formalized language that is directly amenable to analysis using formal mathematical logic. The Prolog language is an example of such a language. A program specification may include one or more module specifications that indicate other modules callable by the module. A program implementation refers to a software program written using a particular programming language. A program specification and a program implementation may be expressed using the same language.

Figure 4A:
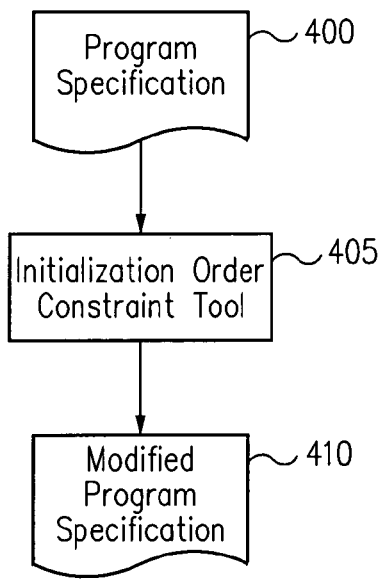
FIG. 4A is a block diagram that illustrates using an initialization order constraint tool to verify a program specification in accordance with one embodiment of the present invention.
Figure 4B:
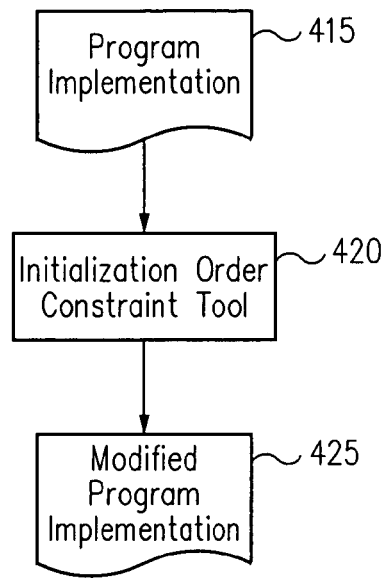
FIG. 4B is a block diagram that illustrates using an initialization order constraint tool to verify a program implementation specification in accordance with one embodiment of the present invention.
Figure 4C:
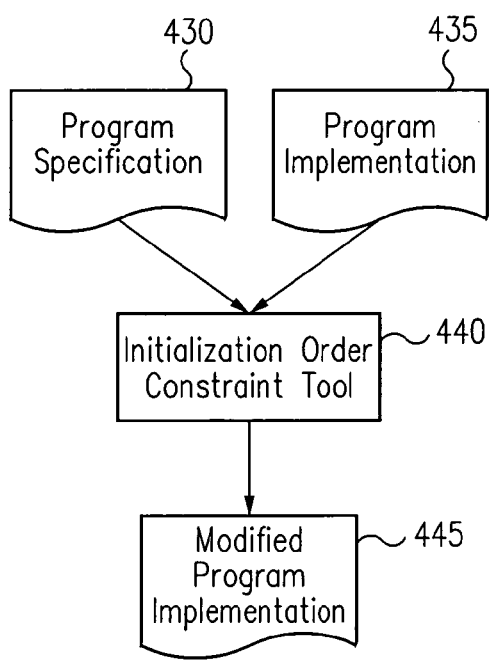
FIG. 4C is a block diagram that illustrates using an initialization order constraint tool to verify consistency between a program specification and a program implementation specification in accordance with one embodiment of the present invention.

FIGS. 4A–4C illustrate using an initialization order constraint tool to verify consistency between program units, initialization order constraints and corresponding calling order constraints in accordance with embodiments of the present invention.

Turning now to FIG. 4A, a block diagram that illustrates using an initialization order constraint tool to verify a program specification in accordance with one embodiment of the present invention is presented. According to this embodiment, an initialization order constraint tool 405 receives a program specification 400 and determines whether the program specification 400 is internally consistent with respect to the initialization order constraints and the corresponding calling order constraints. If the program specification 400 is inconsistent, an attempt is made to modify the program specification to make it consistent with the constraints. For example, suppose a program specification 400 indicates a module "C" calls a module "B", and that module "C" is initialized before module "B". This is inconsistent with the initialization order and calling order constraints because the calling order constraints specify that a module can call another module only if the calling module succeeds the called module in the initialization sequence. Thus, in the present example, an attempt is made to modify the program specification 400 to indicate module "B" is initialized before module "C". In some cases, such as when the calling order is sufficiently convoluted, it may be impossible to change the program specification 400. If so, an indication to that effect is made.

Turning now to FIG. 4B, a block diagram that illustrates using an initialization order constraint tool to verify a program implementation in accordance with one embodiment of the present invention is presented. FIG. 4B is similar to FIG. 4A, except that a program implementation 415 is analyzed and potentially modified (425). For example, suppose a program implementation 415 includes a module "C" calls a module "B", and that module "C" is initialized before module "B". This is inconsistent with the initialization order and calling order constraints because the calling order constraints specify that a module can call another module only if the calling module succeeds the called module in the initialization sequence. Thus, in the present example, an attempt is made to modify the program implementation 415 to initialize module "B" before module "C". In some cases, such as when the calling order is sufficiently convoluted, it may be impossible to change the program implementation 415. If so, an indication to that effect is made.

Turning now to FIG. 4C, a block diagram that illustrates using an initialization order constraint tool to verify consistency between a program specification and a program implementation in accordance with one embodiment of the present invention is presented.

According to this embodiment, an initialization order constraint tool 440 receives a program specification 430 and a program implementation 435. The initialization order constraint tool 440 determines whether the program implementation 435 is consistent with respect to the program specification 430. If the program implementation 435 is inconsistent, the program implementation 435 is modified to make it consistent with the program specification 430. For example, suppose a program specification 430 indicates a module "C" calls a module "B", and that module "B" is initialized before module "C". Suppose also that the program implementation 435 initializes module "C" before module "B". This is inconsistent with the initialization order in the program specification 430. Thus, in the present example, the initialization order constraint tool 440 modifies the program implementation 435 to initialize module "B" before initializing module "C".

According to other embodiments of the present invention, code modification is performed automatically by a tool such as a compiler or optimizer or the like. Those of ordinary skill in the art will recognize that other tools may be used to perform the code modification.

Figure 5:
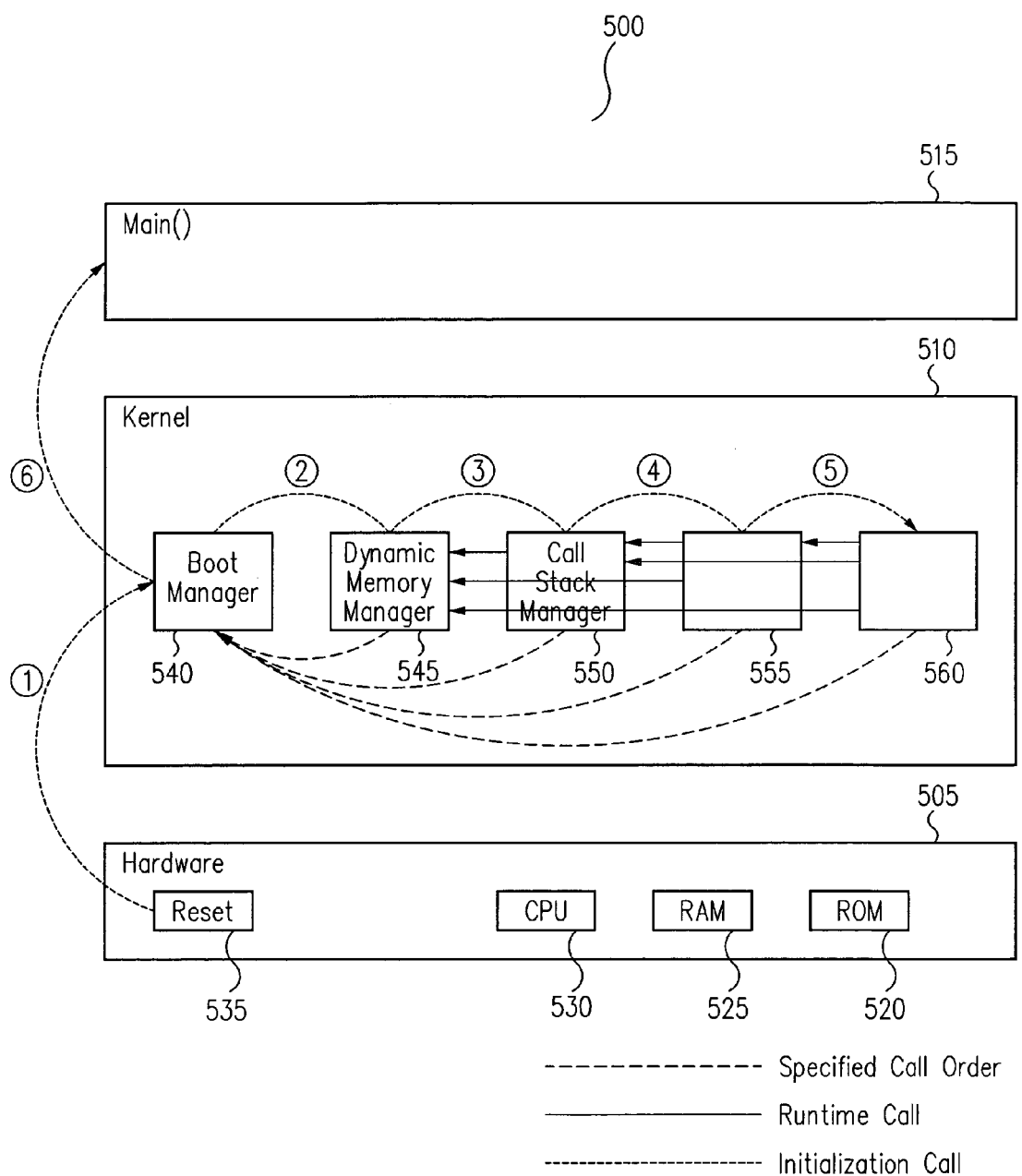
FIG. 5 is a block diagram that illustrates an apparatus for deployment of high integrity software using initialization order and calling order constraints in accordance with one embodiment of the present invention.

Turning now to FIG. 5, a block diagram that illustrates an apparatus for deployment of high integrity software using initialization and calling order constraints in accordance with one embodiment of the present invention is presented. FIG. 5 includes a hardware component 505, a kernel component 510 and a main procedure component 515. Hardware component 505 includes a read-only memory (ROM) 520, a random access memory (RAM) 525, a reset indicator 535 and a central processing unit (CPU) 530.

Kernel component 510 includes executable code modules that include one or more procedures. Modules (540–560) include an initialization procedure to initialize the module (540–560). The initialization procedure must be called before other procedures within the module (540–560) are called. When apparatus 500 is reset, reset indicator 535 sends a signal to boot manager 540. Boot manager 540 calls the initialization procedure of at least one module (540–560) in a predetermined order. As shown in the example illustrated by FIG. 5, the initialization procedure for boot manager 540 is called first, followed by the initialization procedures for dynamic memory manager 545, call stack manager 550, module 555 and module 560.

Calling order constraints in system 500 correspond to the initialization order constraints. A calling module may call any module that occurs before the calling module in the initialization sequence. A special case exists for embodiments where the boot manager module 540 is an actual module rather than a placeholder. If the boot manager module 540 is an actual module, it is limited to calling the initialization procedure for any module (540–560). In the example illustrated by FIG. 5, module 560 may call modules 555, 550, 545 or 540. Module 555 may call modules 550, 545 or 540. Module 550 may call modules 545 or boot manager module 540. Module 545 may call boot manager module 540. Boot manager module 540 is limited to calling the initialization procedure for any of modules 545, 550, 555 or 560.

According to one embodiment of the present invention, boot manager 540 is formally specified in system 500 as providing callable functions to the other modules. The callable functions may indicate the modules called by a particular module. An initialization order constraint tool generates initialization calls based on the information provided in the function calls. For example, suppose a system includes modules A, B, C and D and the program implementation includes the following function calls:

Boot Manager.Init_Order (Calling_Module=>A, Called_Modules=>(C, D))
Boot Manager.Init_Order (Calling_Module=>B, Called_Modules=>(D))
Boot Manager.Init_Order (Calling_Module=>C, Called_Modules=>(B))
Boot Manager.Init_Order (Calling_Module=>D, Called_Modules=>())

The above function calls indicate module A calls modules C and D, module B calls module D, module C calls module B and module D calls no other modules. Since module A calls modules C and D, module A must be initialized after modules C and D. Since module B calls module D, module B must be initialized after module D. Since module C calls module B, module C must be initialized after module B. An initialization order constraint tool uses this information to generate an appropriate sequence of initialization calls such as:

D.Initialize()
B.Initialize()
C.Initialize()
A.Initialize()

According to another embodiment of the present invention, procedure calling relationship information is included in module annotations. The annotations indicate which modules the annotated module calls. The initialization order constraint tool examines these annotations and performs a topological sort to determine the required initialization order and the corresponding calling order constraints.

According to one embodiment of the present invention, the initialization order constraint tool modifies the program code based on the calling relationships extracted from the modules to create a sequence of program calls as illustrated above. In operation, when a program is reset, per-module program initialization proceeds according to the sequence of program calls.

According to another embodiment of the present invention, the initialization order constraint tool creates a jump table that includes the addresses of the initialization routines in the appropriate order. In operation, when a program is reset, per-module program initialization proceeds according to the jump table.

Still referring to FIG. 5, both call stack manager 550 and memory manager 545 are placeholders or formalizations of program elements. Memory manager 545 manages dynamic memory allocation requests from other modules. The dynamic memory allocation requests are analyzed to determine bounds on the allocations. The software program may be rewritten using a dynamic memory tool to replace dynamic memory allocation requests with static memory allocations as disclosed in copending U.S. patent application Ser. No. 10/101,289, filed Mar. 18, 2002 in the name of Eduard de Jong, entitled "Method and Apparatus for Deployment of High Integrity Software Using Reduced Dynamic Memory Allocation".

The call stack manager 550 allocates space for static, pre-allocated return addresses. The call stack manager 550 allocates the space by making a procedure call to the memory manager 545, including the memory allocation request. Since the call stack manager 550 must call or use the services of the memory manager 545, the call stack manager 550 is placed after the memory manager in the initialization sequence. Placing the call stack manager 550 formally early in the initialization sequence guarantees memory allocation for the static return addresses. It also guarantees static allocation of a memory area for a call stack. The call allows the memory manager 545 to reserve space for the static return addresses in its formal model of memory. The logic of the call stack manager is a call stack tool, which may rewrite modules to use static locations to store procedure return addresses, as disclosed in copending U.S. patent application Ser. No. 10/100,838,, filed Mar. 18, 2002 in the name of Eduard de Jong and Pieter Hartel, entitled "Method and Apparatus for Deployment of High Integrity Software Using Static Procedure Return Addresses".

Figure 6:
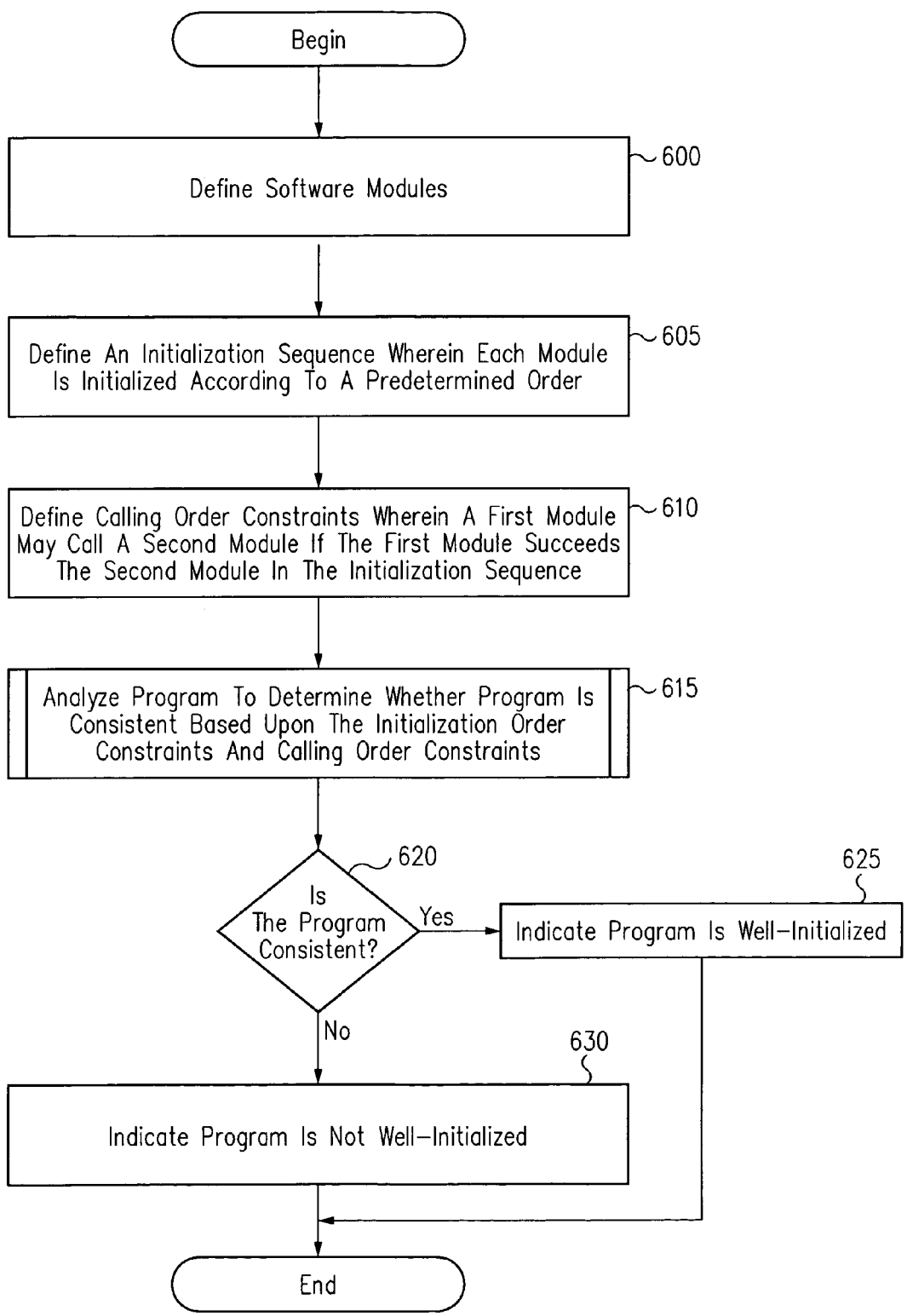
FIG. 6 is a flow diagram that illustrates a method for deployment of high integrity software using initialization order and calling order constraints in accordance with one embodiment of the present invention.

Turning now to FIG. 6, a flow diagram that illustrates a method for deployment of high integrity software using initialization order and calling order constraints in accordance with one embodiment of the present invention is presented. At 600, software modules are defined. Required program procedures are identified and each procedure is assigned to a module. Module initialization procedures are defined. If a module does not require an initialization procedure, a placeholder for the module is included in the initialization sequence. At 605, an initialization sequence is defined wherein each module is initialized according to a predetermined order. At 610, calling order constraints based on the initialization order constraints are defined. The initialization sequence specifies that a first module may call a second module if the first module succeeds the second module in the initialization sequence. For example, suppose the initialization sequence for a set of modules (A, B, C) is module "A", followed by module "B", followed by module "C". In this case, the calling order constraints are such that module "C" may call module "B" or module "A"; module "B" may call module "A"; and module "A" may call neither module "B" nor module "C".

Still referring to FIG. 6, at 615 the program is analyzed to determine whether the program is consistent based upon the initialization order constraints and calling order constraints. This may include determining whether a program specification is internally consistent with respect to itself, and whether a program implementation is consistent with respect to its program specification. At 620, the results of the process described at 615 are examined to determine whether the program is consistent. If the program is consistent, at 625 an indication that the program is well initialized is made. If the program is inconsistent, at 630 an indication that the program is not well initialized is made. The problem may be corrected by modifying the program specification and/or the program implementation, depending upon which one is inconsistent.

Figure 7:
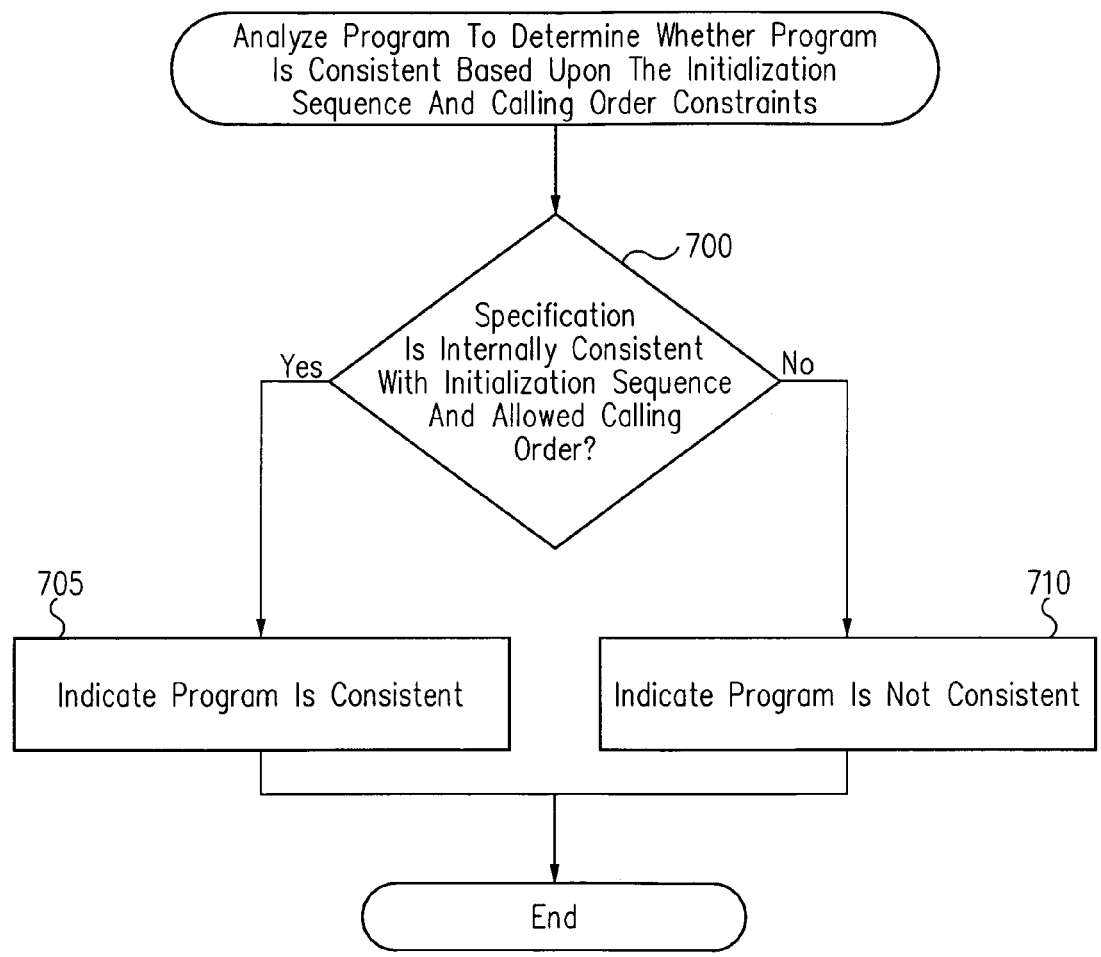
FIG. 7 is a flow diagram that illustrates a method for analyzing a program to determine whether a program is consistent based whether a program specification is internally consistent with respect to an initialization sequence and calling order constraints in accordance with one embodiment of the present invention.
Figure 8:
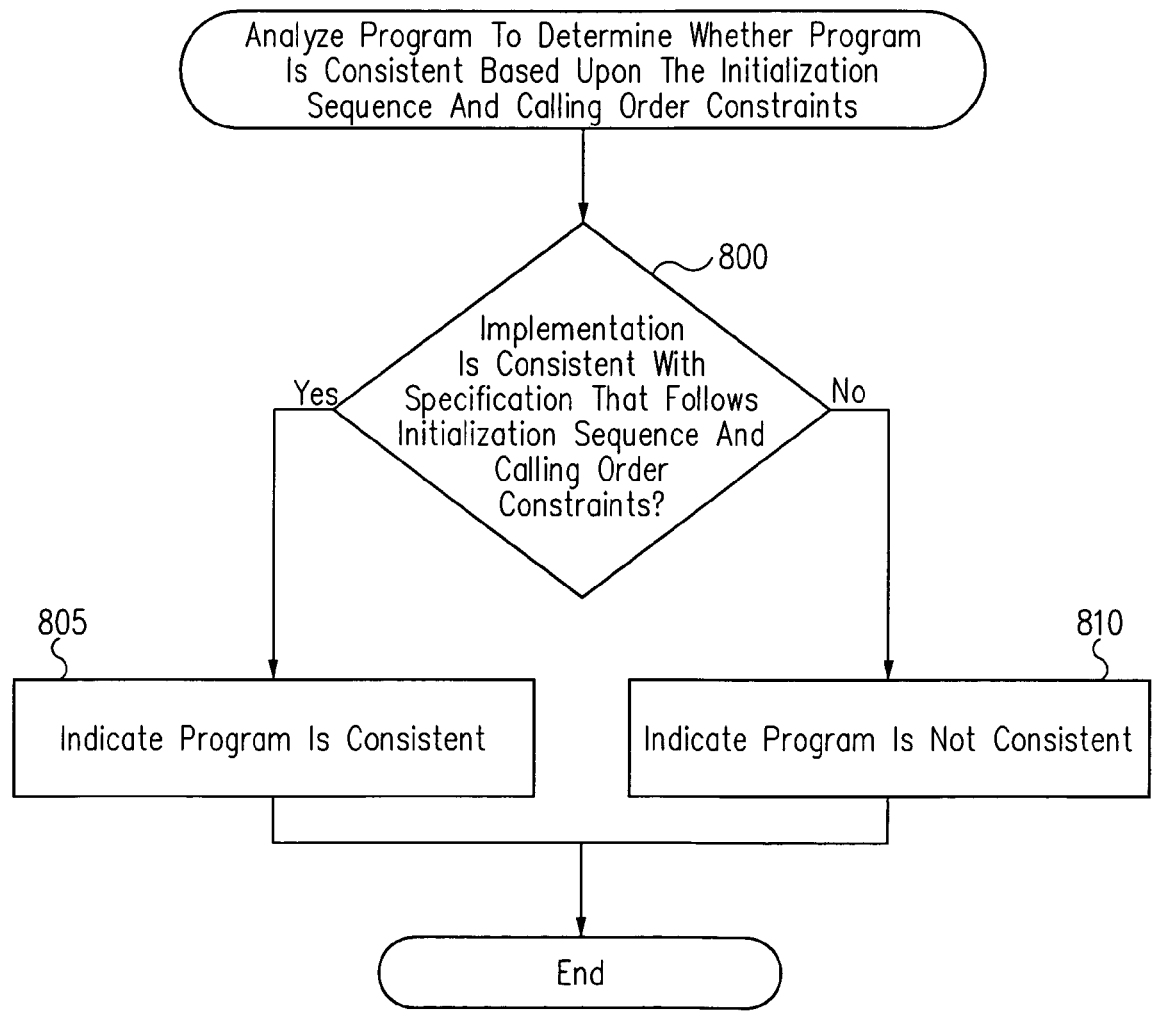
FIG. 8 is a flow diagram that illustrates a method for analyzing a program to determine whether a program is consistent based upon whether an implementation of the program is consistent with a specification that follows an initialization sequence and calling order constraints in accordance with one embodiment of the present invention.

FIGS. 7–8 are flow diagrams that illustrate methods for analyzing a program to determine whether the program is consistent based upon the initialization sequence constraints and the corresponding calling order constraints. FIG. 7 illustrates determining whether a program specification is internally consistent with respect to the initialization sequence constraints and the corresponding calling order constraints. This is a process performed by initialization order constraint tool 405 in FIG. 4A. FIG. 8 illustrates determining whether a program implementation is consistent with respect to its program specification. FIG. 8 illustrates modifying a program implementation to make it consistent with its corresponding program specification when the program implementation is inconsistent with its program specification. This is a process performed by initialization order constraint tool 440 in FIG. 4C.

Turning now to FIG. 7, a flow diagram that illustrates a method for analyzing a program to determine whether a program is consistent based on whether a program specification is internally consistent with respect to an initialization sequence and calling order constraints in accordance with one embodiment of the present invention is presented. FIG. 7 provides more detail for reference numeral 615 in FIG. 6. At 700, a determination is made regarding whether the specification is internally consistent with the initialization sequence and calling order constraints.

A specification is internally consistent with the initialization sequence and calling order constraints if the initialization order specified by the program specification is consistent with the calling order constraints specified by the program specification. For example, suppose a system includes three modules: module "A", module "B" and module "C" and that each module includes an initialization procedure ("AI", "BI", "CI", respectfully) and a non-initialization procedure ("AN", "BN", "CN", respectfully). If the specification indicates the initialization sequence is "AI-BI-CI", the calling order constraints may be derived. Procedure "CN" may call procedure "BN" or procedure "AN", and procedure "BN" may call procedure "AN". Thus, if the same specification indicates a procedure call other than these (such as procedure "BN" calling procedure "CN" or procedure "AN" calling procedure "BN"), the specification is flagged as inconsistent at 710. If the specification is internally consistent, an indication that the program is consistent is made at 705.

Turning now to FIG. 8, a flow diagram that illustrates a method for analyzing a program to determine whether a program is consistent based upon whether an implementation of the program is consistent with a specification that follows an initialization sequence and calling order constraints in accordance with one embodiment of the present invention is presented. FIG. 8 provides more detail for reference numeral 615 in FIG. 6. At 800, a determination is made regarding whether the implementation is consistent with a specification that follows the initialization sequence and calling order constraints.

An implementation is consistent with a specification if the initialization order constraints and calling order constraints derived from the specification are consistent with the initialization order and calling order of the implementation corresponding to the specification. Using the example discussed above with respect to FIG. 7, if the implementation indicates a procedure call is inconsistent with the specification (such as procedure "BN" calling procedure "CN" or procedure "AN" calling procedure "BN"), the implementation is flagged as inconsistent at 810. If the implementation is consistent, an indication that the program is consistent is made at 805.

Figure 9:
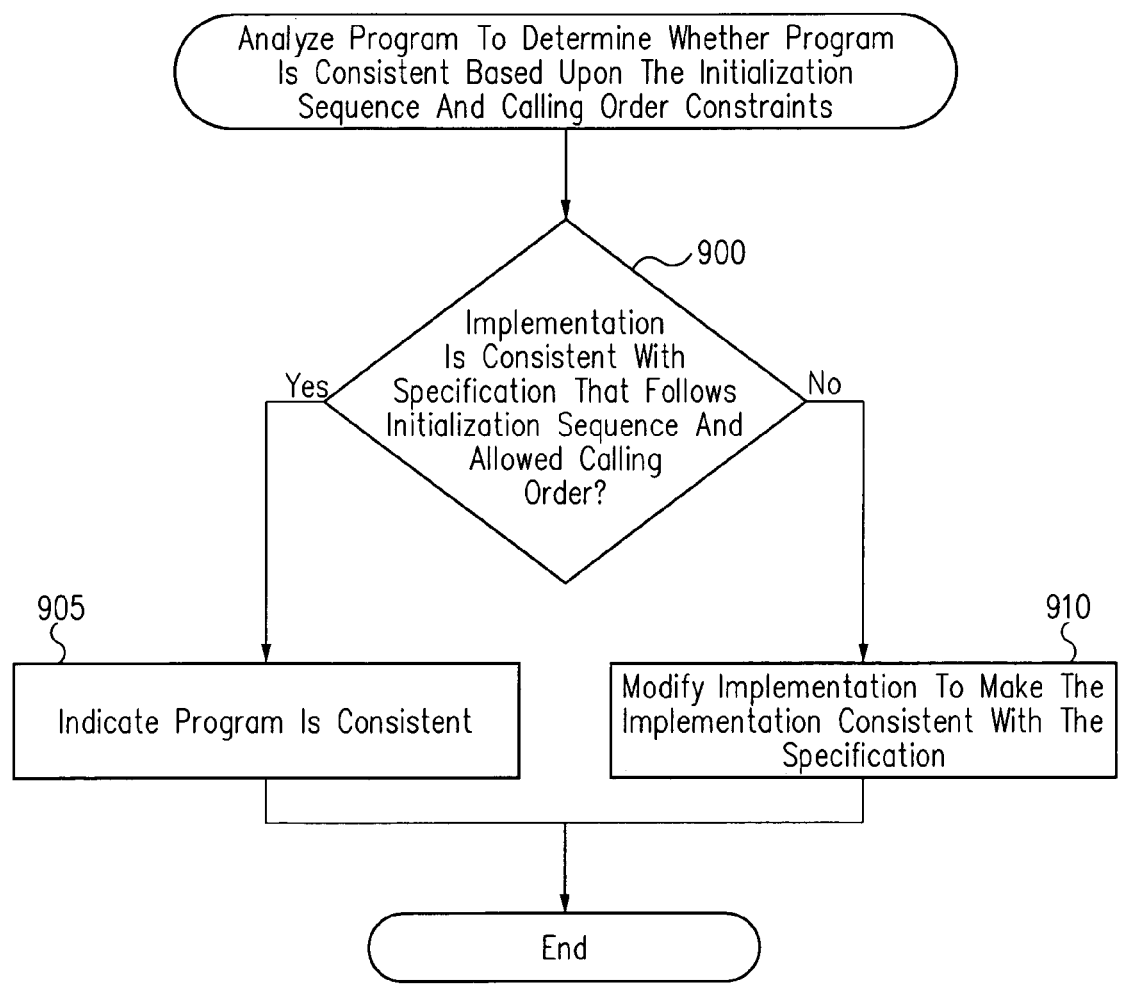
FIG. 9 is a flow diagram that illustrates a method for modifying a program implementation to make it consistent with a program specification if it is inconsistent with respect to the program specification in accordance with one embodiment of the present invention.

Turning now to FIG. 9, a flow diagram that illustrates a method for modifying a program implementation to make it consistent with a program specification if it is inconsistent with respect to the program specification in accordance with one embodiment of the present invention is presented. FIG. 9 provides more detail for reference numeral 615 in FIG. 6. At 900, a determination is made regarding whether the implementation is consistent with a specification that follows the initialization sequence and calling order constraints. If the implementation is consistent, an indication that the program is consistent is made at 905. If the implementation is not consistent, the implementation is modified to make it consistent with the specification at 910.

According to one embodiment of the present invention, the program modules are organized into layers. This explained in more detail below with reference to FIG. 10.

Figure 10:
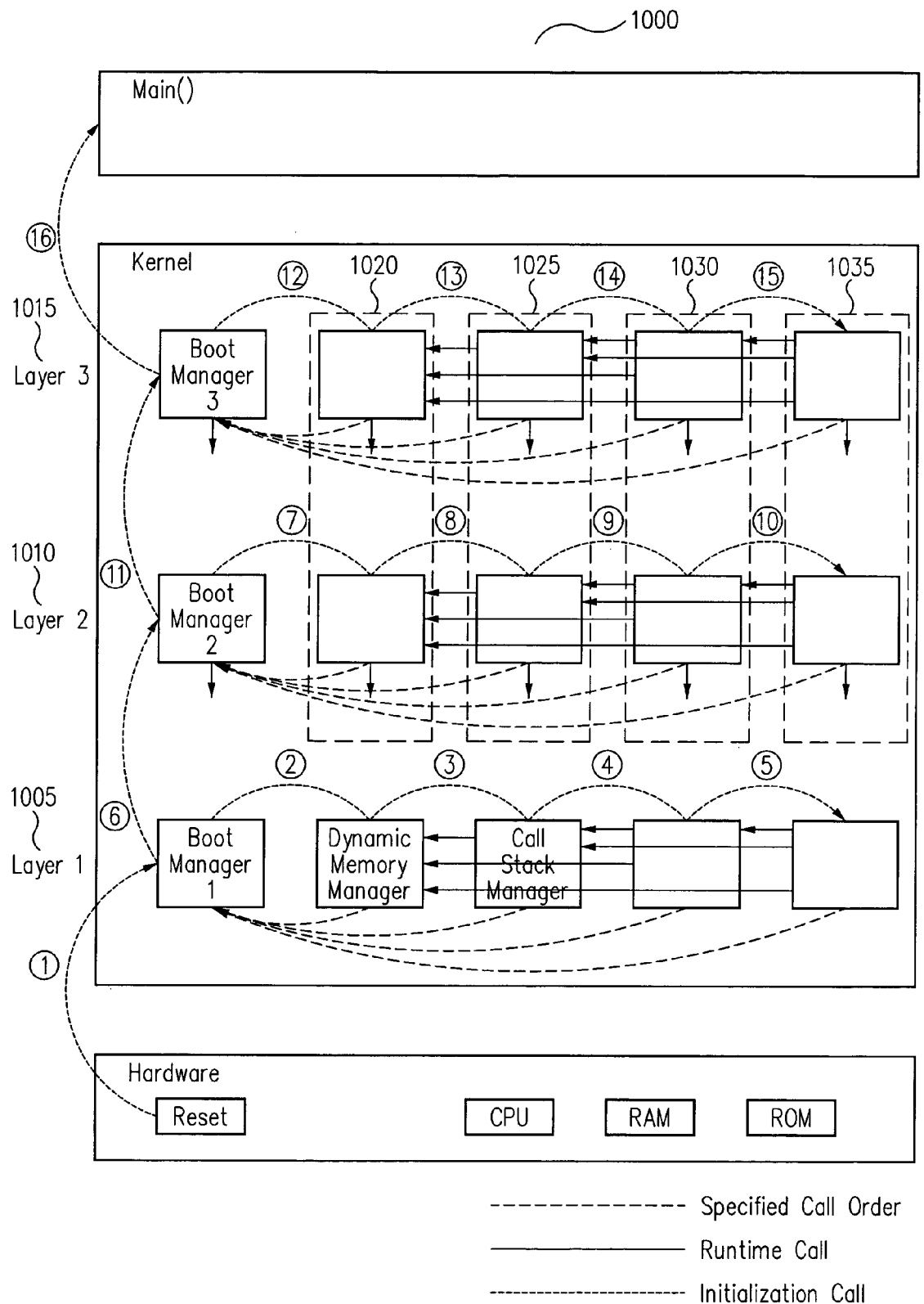
FIG. 10 is a block diagram that illustrates an apparatus for deployment of high integrity software using initialization order and calling order constraints in a layered software design in accordance with one embodiment of the present invention.

Turning now to FIG. 10, a block diagram that illustrates an apparatus for deployment of high integrity software using initialization order and calling order constraints in a layered software design in accordance with one embodiment of the present invention is presented. FIG. 10 is similar to FIG. 5, except that FIG. 10 includes multiple module layers. Layer 1 (1005) includes modules that have relatively unrestricted functionality and are at a relatively low level of abstraction. Layer 3 (1015) includes modules that have relatively restricted functionality and are at a relatively high level of abstraction.

According to one embodiment of the present invention, the number of layers is three. According to another embodiment of the present invention, the number of layers is four. Those of ordinary skill in the art will recognize a different number of layers is possible within the inventive concepts disclosed herein.

System 1000 may be further organized into columns of related functionality. Four columns of related functionality (1020, 1025, 1030, 1035) are shown in FIG. 10. In an exemplary arrangement, a layer 3 (1015) module is an "Input/Output Manager" module that handles many types of high level input and output. A corresponding layer 2 (1010) module is a "Buffer Input/Output" module that handles page-oriented input and output. A corresponding layer 1 (1005) module is a "Byte Input/Output" module that handles low-level byte input and output. Those of ordinary skill in the art will recognize that many other groupings are possible.

Figure 11:
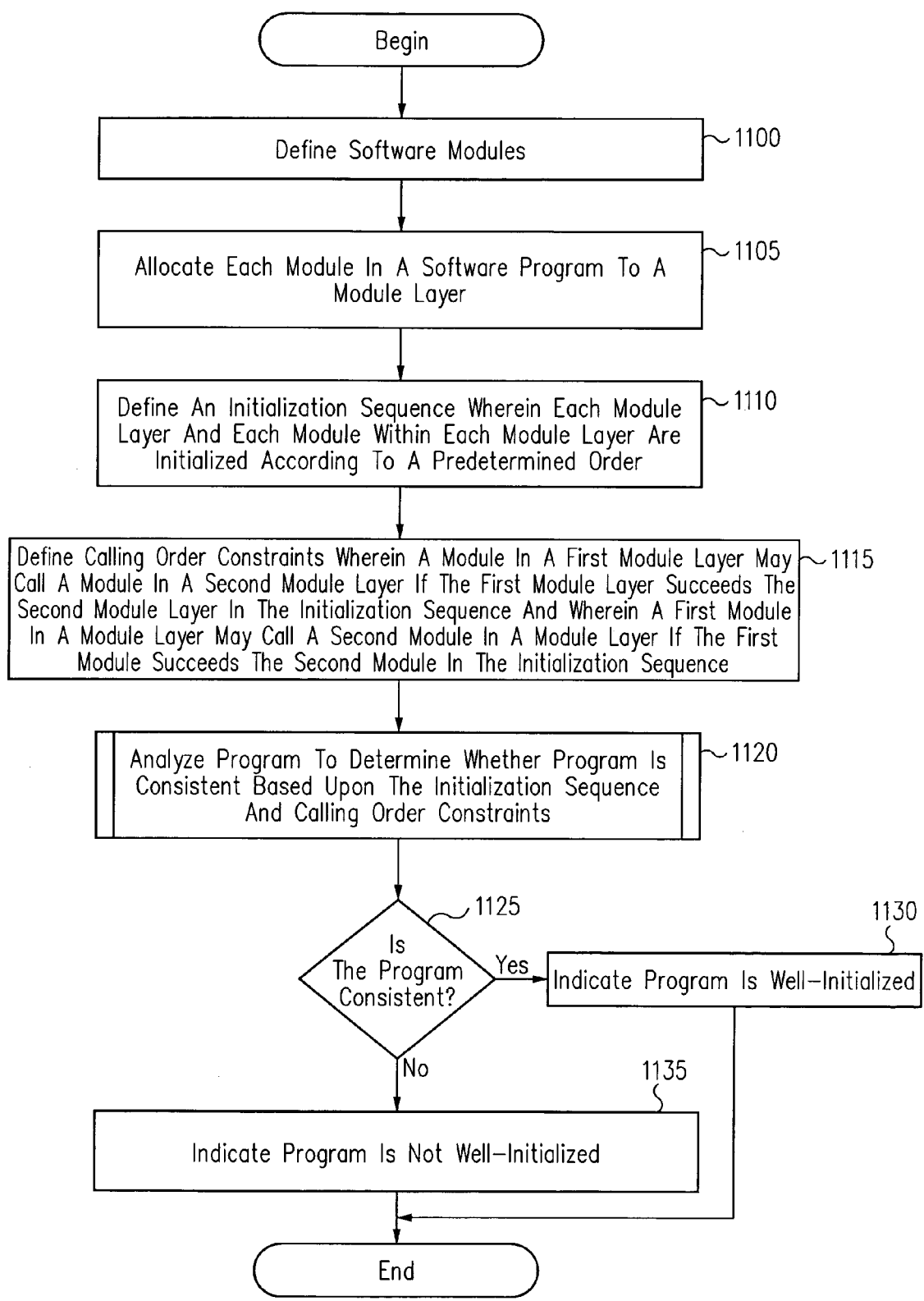
FIG. 11 is a flow diagram that illustrates a method for deployment of high integrity software using initialization order and calling order constraints in a layered software design in accordance with one embodiment of the present invention.

Turning now to FIG. 11, a flow diagram that illustrates a method for deployment of high integrity software using initialization order and calling order constraints in a layered software design in accordance with one embodiment of the present invention is presented. FIG. 11 is similar to FIG. 6, except that the method illustrated by FIG. 11 supports multiple module layers. At 1100, software modules are defined. Required program procedures are identified and each procedure is assigned to a module. Each module may include an initialization procedure. If a module does not require an initialization procedure, a formal placeholder for the module is maintained in the initialization sequence. At 1105, each module is allocated to a module layer. At 1110, an initialization sequence is defined wherein each module layer and each module within each module layer are initialized according to a predetermined order. At 1115, calling order constraints are defined wherein a module in a first module layer may call a module in a second module layer if the first module layer succeeds the second module layer in the initialization sequence and wherein a first module in a module layer may call a second module in a module layer if the module succeeds the second module in the initialization sequence. At 1120, the program is analyzed to determine whether the program is consistent based upon the initialization sequence and calling order constraints. If the program is consistent, an indication that the program is well initialized is made at 1130. If the program is not consistent, an indication that the program is not well initialized is made at 1135.

Figure 12:
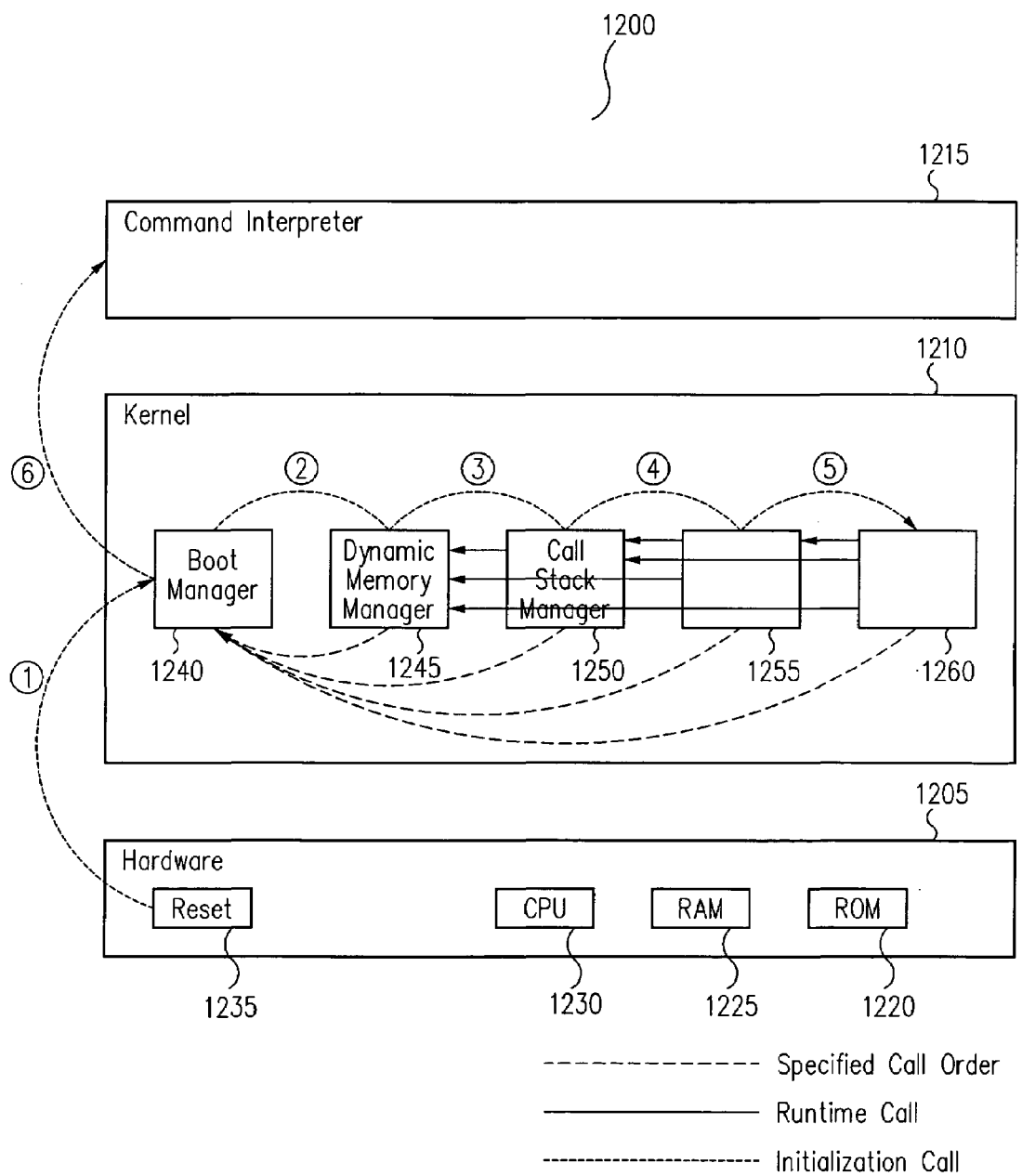
FIG. 12 is a block diagram that illustrates an apparatus for deployment of high integrity command interpreter software using initialization order and calling order constraints in accordance with one embodiment of the present invention.

Turning now to FIG. 12, a block diagram that illustrates an apparatus for deployment of high integrity command interpreter software using initialization order and calling order constraints in accordance with one embodiment of the present invention is presented. FIG. 12 is similar to FIG. 5, except that the embodiment illustrated in FIG. 12 includes a command interpreter 1215 at the end of the initialization sequence. Command interpreter 1215 receives commands and executes them. Since the command interpreter 1215 is at the end of the initialization sequence, the command interpreter 1215 may call any module in the kernel 1210, but no module in the kernel 1210 may call a module in the command interpreter 1215.

Figure 13:
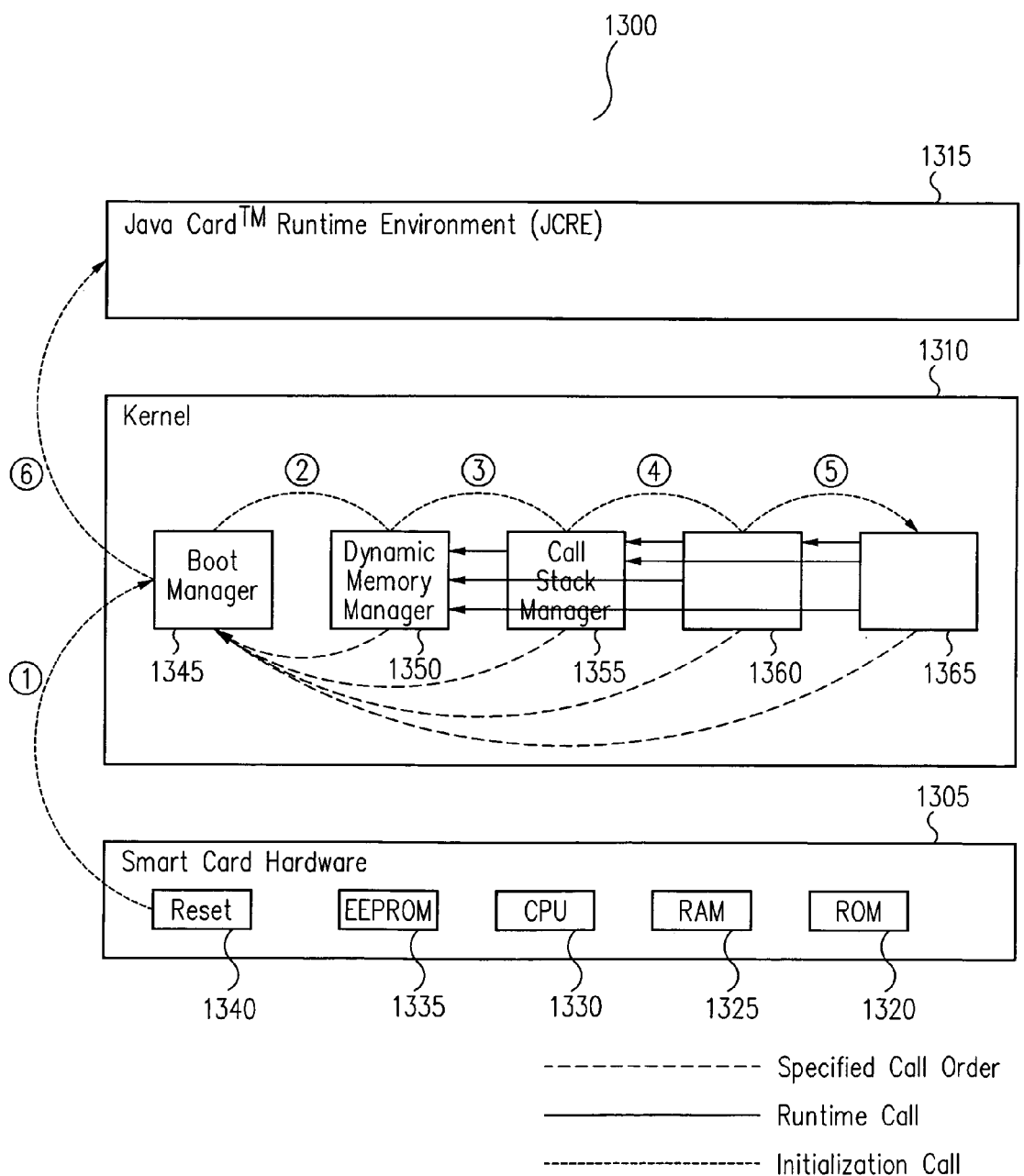
FIG. 13 is a block diagram that illustrates an apparatus for deployment of high integrity Java Card™ runtime environment (JCRE) software using initialization order and calling order constraints in accordance with one embodiment of the present invention.

Turning now to FIG. 13, a block diagram that illustrates an apparatus for deployment of high integrity Java Card™ runtime environment (JCRE) software using initialization order and calling order constraints in accordance with one embodiment of the present invention is presented. FIG. 13 is similar to FIG. 5, except that the embodiment illustrated in FIG. 13 includes the Java Card™ runtime environment 1315 at the end of the initialization sequence. Since the JCRE 1315 is at the end of the initialization sequence, the JCRE 1315 may call any module in the kernel 1310, but no module in the kernel 1310 may call a module in the JCRE 1315.

Figure 14:
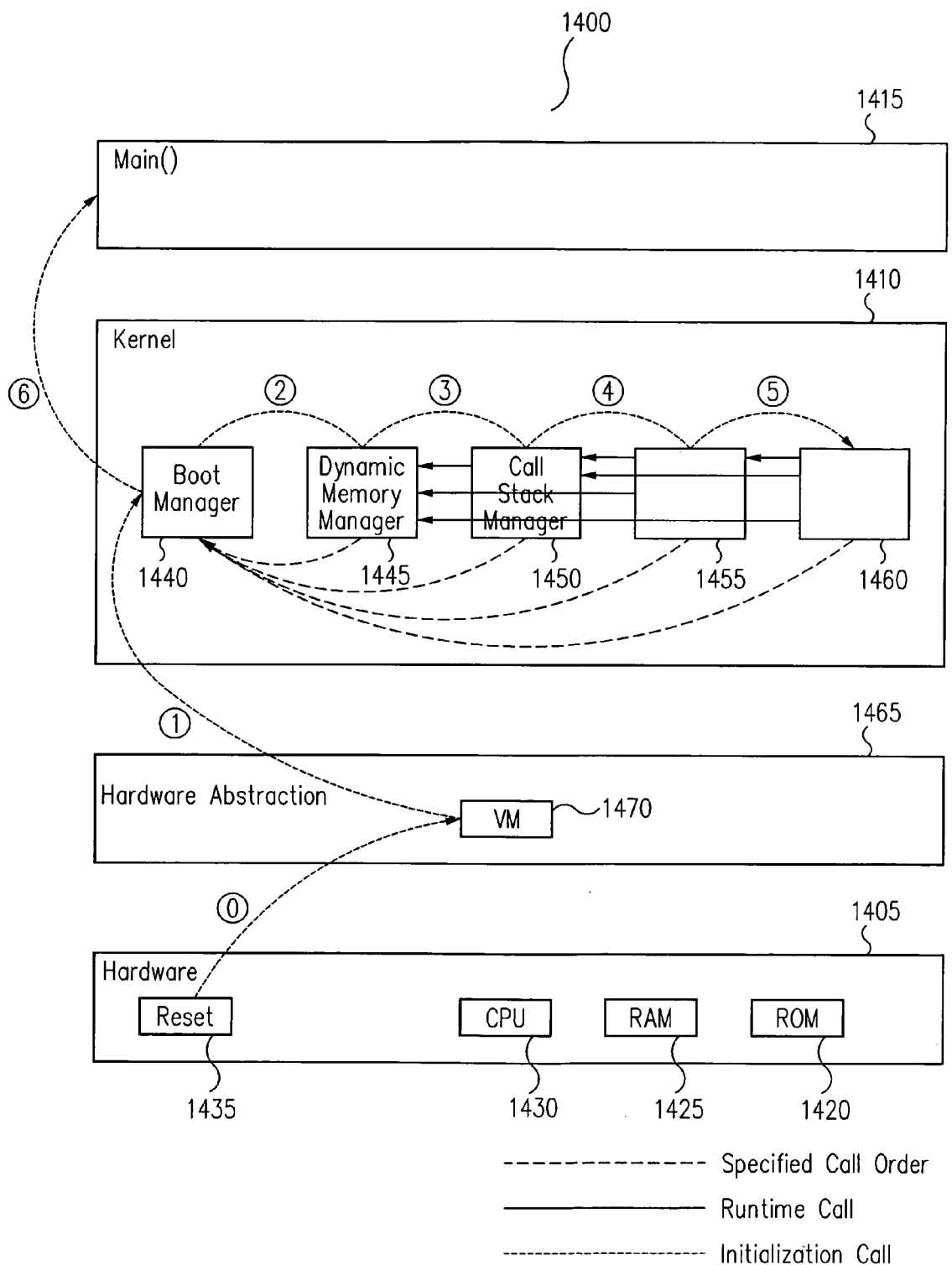
FIG. 14 is a block diagram that illustrates an apparatus for deployment of high integrity software using initialization order and calling order constraints and a hardware abstraction layer that includes a virtual machine (VM) in accordance with one embodiment of the present invention.

Turning now to FIG. 14, a block diagram that illustrates an apparatus for deployment of high integrity software using initialization order and calling order constraints and a hardware-abstraction layer that includes a virtual machine (VM) in accordance with one embodiment of the present invention is presented. FIG. 14 is similar to FIG. 5, except that in the embodiment illustrated in FIG. 14, the CPU of hardware layer 1405 comprises a hardware abstraction layer 1465 including a virtual machine 1430. Hardware abstraction layer 1465 may include one or more additional software modules. According to one embodiment, virtual machine 1470 executes instructions in kernel component 1410 modules.

Figure 15:
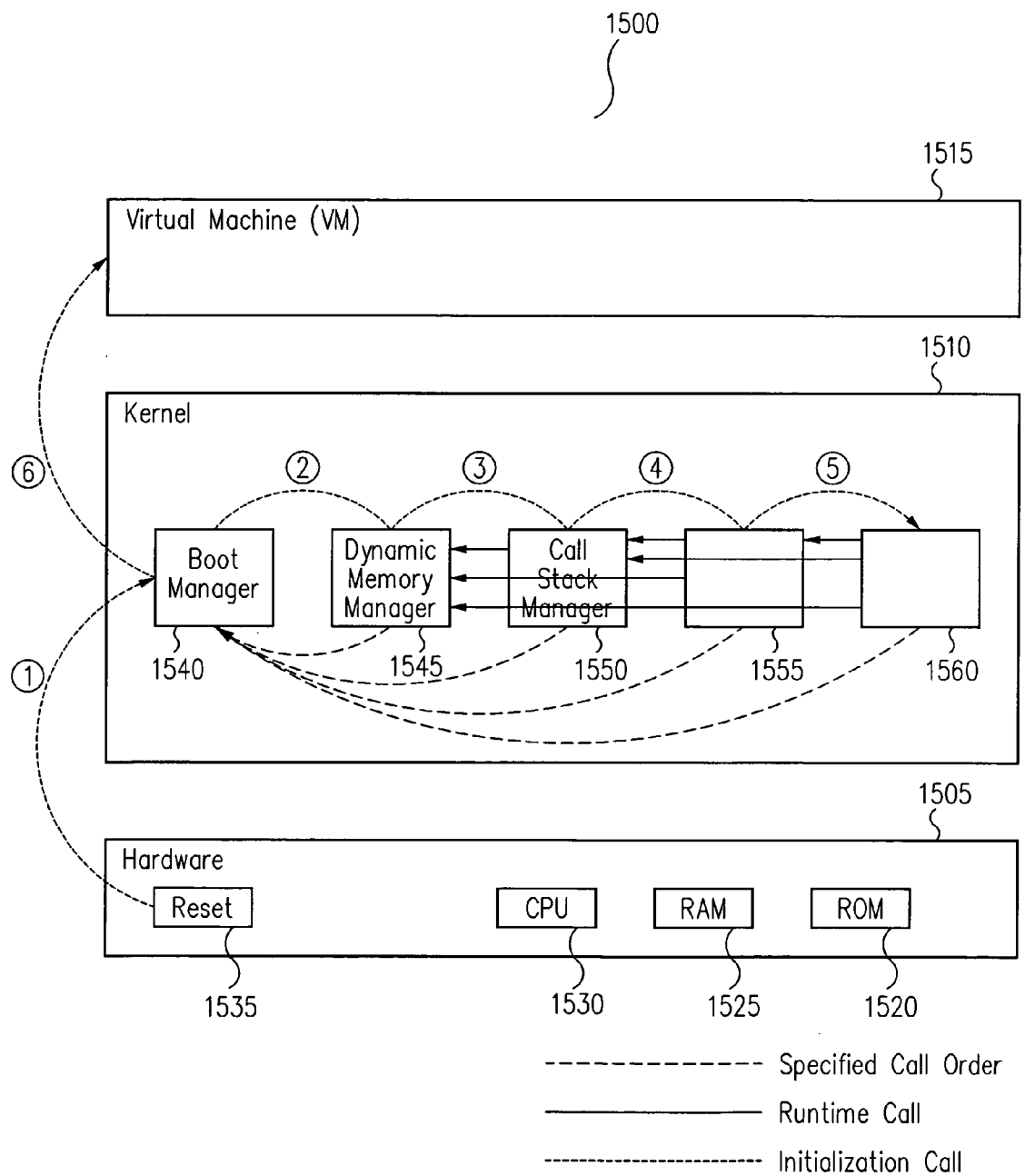
FIG. 15 is a block diagram that illustrates an apparatus for deployment of high integrity virtual machine (VM) software using initialization order and calling order constraints in accordance with one embodiment of the present invention.

Turning now to FIG. 15, a block diagram that illustrates an apparatus for deployment of high integrity virtual machine (VM) software using initialization order and calling order constraints in accordance with one embodiment of the present invention is presented. FIG. 15 is similar to FIG. 5, except that the embodiment illustrated in FIG. 15 includes a virtual machine 1515 at the end of the initialization sequence. Since the VM 1515 is at the end of the initialization sequence, the VM implementation 1515 may call any module in the kernel 1510, but no module in the kernel 1510 may call a module in the VM implementation 1515.

Figure 16A:
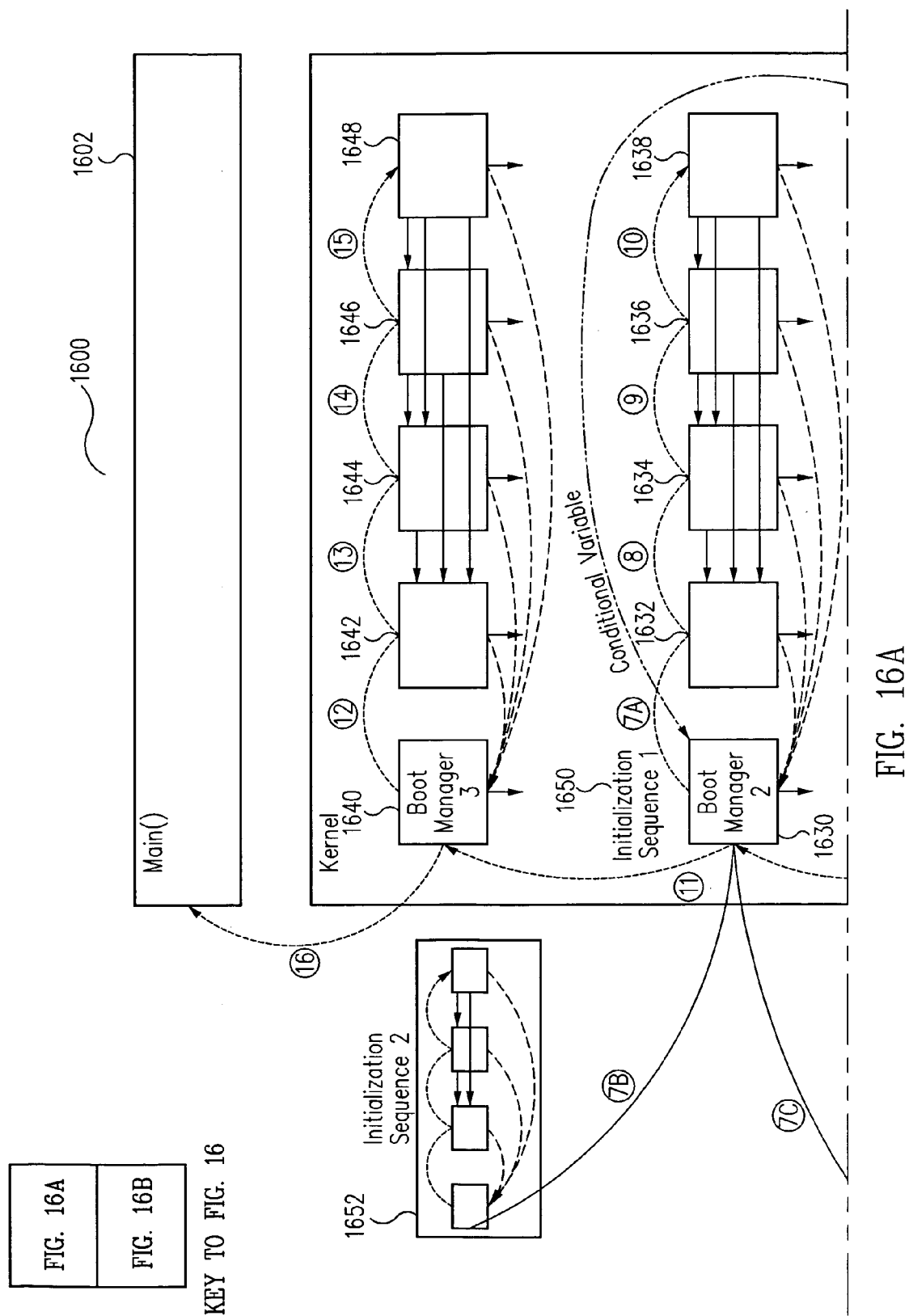
FIG. 16 is a key to FIGS. 16A and 16B, which are a block diagram that illustrates an apparatus for deployment of high integrity software using initialization order and calling order constraints in accordance with one embodiment of the present invention.
Figure 16B:
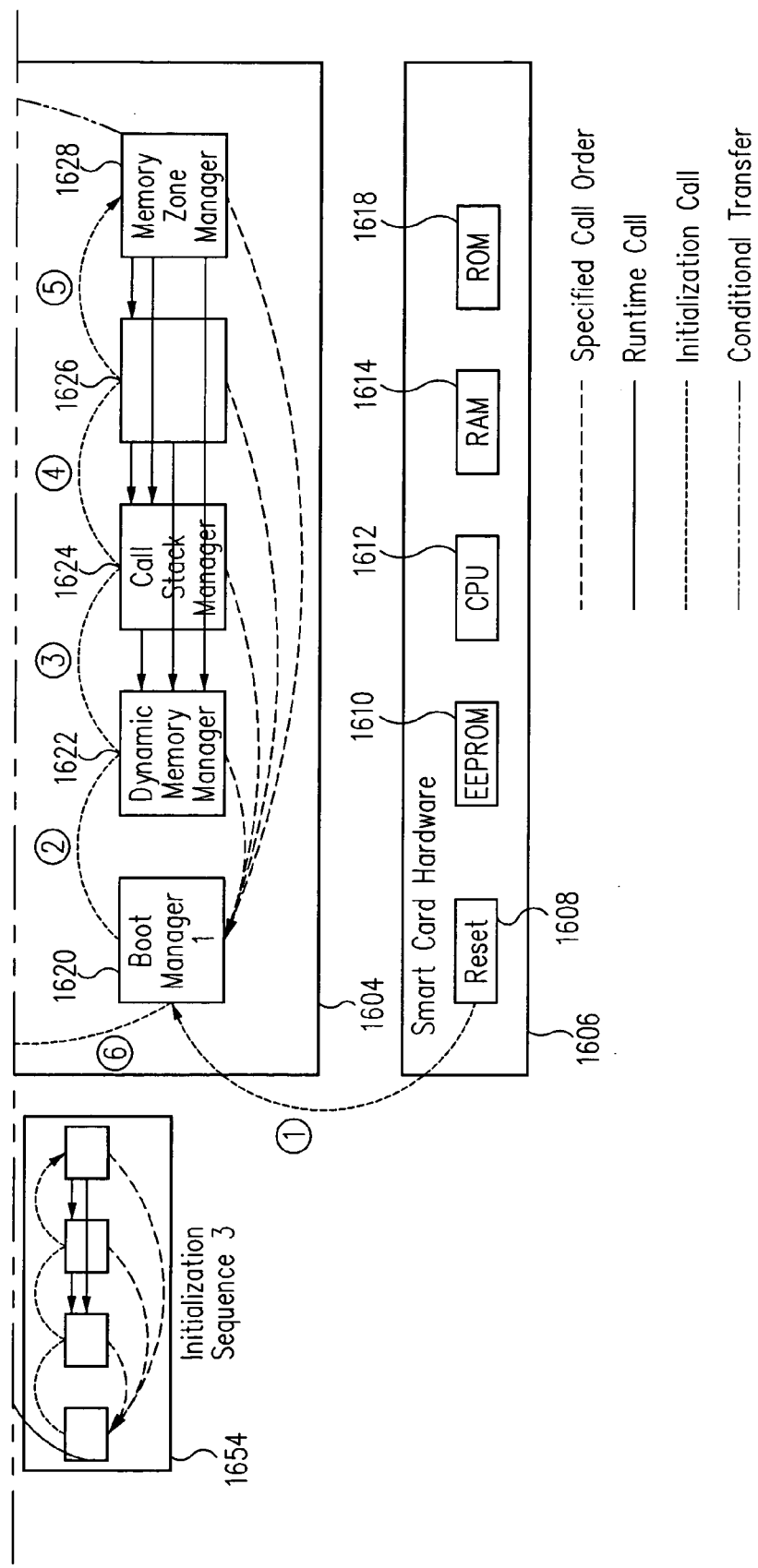

Turning now to FIG. 16, which is a key to FIGS. 16A and 16B, a block diagram that illustrates an apparatus for deployment of high integrity software using initialization order and calling order constraints in accordance with one embodiment of the present invention is presented. FIG. 16 is similar to FIG. 5, except that the embodiment illustrated in FIG. 16 includes multiple initialization sequences and corresponding calling order constraints. The initialization sequence is determined based upon a conditional variable set by a memory zone manager module 1628. According to one embodiment, the conditional variable is set based on the presence of one or more markers in a persistent mutable memory such as EEPROM 1605 as described in copending U.S. patent application Ser. No. 10/101,290, filed Mar. 18, 2002 in the name of Eduard de Jong, entitled "Enhanced Memory Management for Portable Devices". According to another embodiment, the conditional variable is set via one or more hardware fuses.

When apparatus 1600 is reset, reset indicator 1608 sends a signal to boot manager 1 (1620). Boot manager 1 (1620) calls the initialization procedure of at least one module (1622–1628) in a predetermined order. As shown in the example illustrated by FIG. 16, which is a key to FIGS. 16A and 16B, the initialization procedure for module 1622 is called first, followed by the initialization procedures for modules 1624, 1626 and 1628. Memory zone module 1628 includes code to set a conditional variable. According to one embodiment, the conditional variable is set based upon the presence of one or more markers in a persistent mutable memory such as EEPROM 1610. According to another embodiment, the conditional variable is set via one or more hardware fuses. Upon initialization of memory zone modules 1622–1628, boot manager 1 (1620) invokes or transfers program control to boot manager 2 (1630). Boot manager 2 (1630) calls or otherwise obtains a conditional variable set by memory zone manager 1628. Boot manager 2 (1630) uses the conditional variable to determine an operational mode. Exemplary operational modes include "Configuration", "Kernel", "Application", "Diagnostic" and "Dead" modes, with "Configuration" mode being a relatively privileged mode and "Dead" mode being a relatively unprivileged mode.

Still referring to FIG. 16, which is a key to FIGS. 16A and 16B, boot manager 2 (1630) selects an initialization sequence based on the operational mode. By way of example, if the operational mode is "Configuration" mode, the initialization sequence for "Configuration" mode is selected. Likewise, if the operational mode is "Kernel" mode, the initialization sequence for "Kernel" mode is selected. Three initialization sequences are shown in FIG. 16. A first initialization sequence continues at 1650. A second initialization sequence continues at 1652 and a third initialization sequence continues at 1654. Those of ordinary skill in the art will recognize that a different number of initialization sequences and corresponding operational modes are possible.

According to one embodiment of the present invention, the program specification is separate from the program implementation. According to another embodiment of the present invention, the program specification is embedded within the program implementation.

According to one embodiment of the present invention, an annotation in the software program implementation is used to define the calling order constraints. The annotation may comprise a part of the program specification. By way of example, the program specification may comprise a collection of program comments interspersed throughout the program implementation. A procedure call in a program implementation may include an initialization sequence constraint or calling order constraint delimited by a comment character, where the constraint comprises a part of the program specification.

According to one embodiment of the present invention, the program implementation analyzed by the initialization order constraint tool is targeted for execution on a resource-constrained device. According to one embodiment of the present invention, the resource-constrained device comprises a smart card. According to another embodiment of the present invention, the smart card comprises a Java Card™ technology-enabled smart card. The invention can be used with other resource-constrained devices including, but not limited to, cellular telephones, boundary scan devices, field programmable devices, personal digital assistants (PDAs) and pagers, as well as other miniature or small-footprint devices. The invention can also be used on non-resource constrained devices.

According to another embodiment of the present invention, the program implementation that comprises the initialization order constraint tool is itself developed using an initialization order constraint tool, simplifying the verification of a program that can be used to simplify verification of other programs.

Embodiments of the present invention have a number of advantages. Imposing initialization and calling order constraints simplifies program verification by reducing the state space and thus reducing the amount of program verification required.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-based method for designing a software program comprising a plurality of modules, the method comprising:
defining at least one initialization sequence wherein each module of said plurality of modules is initialized according to a predetermined order;
defining calling order constraints wherein a first module may call a second module if said first module succeeds said second module in said predetermined order; and
creating a program specification for said software program, said program specification comprising a module specification for each module of said plurality of modules, said module specification indicating other modules called by an implementation of said module.

2. The method of claim 1 wherein at least one of said plurality of modules comprises an initialization procedure to be called once before any other procedure in the same module is called.

3. The method of claim 1, further comprising determining whether said program specification is consistent with said initialization sequence and said calling order constraints.

4. The method of claim 3, further comprising modifying said program specification to make said program specification consistent with said initialization sequence and said calling order constraints if said program specification is inconsistent with said initialization sequence and said calling order constraints.

5. The method of claim 1, further comprising determining whether an implementation of said software program is consistent with said program specification, said program specification being consistent with said initialization sequence and said calling order constraints.

6. The method of claim 1, further comprising modifying an implementation of said software program to make said implementation consistent with said program specification, said program specification being consistent with said initialization sequence and said calling order constraints.

7. The method of claim 1, further comprising:
determining whether said program specification is consistent with said initialization sequence and said calling order constraints;
determining whether an implementation of said software program is consistent with said program specification if said program specification is consistent with said initialization sequence and said calling order constraints; and
modifying said implementation of said software program to make said implementation consistent with said program specification if said implementation is not consistent with said program specification.

8. The method of claim 1 wherein said defining calling order constraints further comprises using at least one annotation in said software program to define said calling order constraints.

9. The method of claim 1, further comprising indicating an implementation of said program is consistent if said implementation is consistent with said program specification and if said program specification is consistent with said initialization sequence and said calling order constraints.

10. The method of claim 1 wherein said software program includes a boot manager module, said boot manager module configured to be the first module of said program to execute upon execution of said software program.

11. The method of claim 1 wherein at least one of said plurality of modules is assigned to one of at least one layer of a plurality of software module layers.

12. The method of claim 11, further comprising organizing said plurality of modules in said plurality of software module layers into two or more columns of related functionality.

13. The method of claim 11 wherein said plurality of software module layers comprises three software module layers.

14. The method of claim 11 wherein said plurality of software module layers comprises four software module layers.

15. The method of claim 1 wherein at least part of said specification is embedded within said implementation.

16. The method of claim 15 wherein at least one annotation including a calling order of a plurality of modules is embedded within said implementation.

17. The method of claim 1 wherein said software program is targeted for execution on a resource-constrained device.

18. The method of claim 17 wherein said software program is targeted for execution on a smart card.

19. The method of claim 18 wherein said software program is targeted for execution on a Java Card™ technology-enabled smart card.

20. The method of claim 1 wherein said initialization sequence terminates with the execution of a command interpreter.

21. The method of claim 1 wherein said initialization sequence terminates with the execution of a Java Card™ Runtime Environment (JCRE).

22. The method of claim 1 wherein said initialization sequence terminates with the execution of a virtual machine (VM).

23. The method of claim 1 wherein
at least one of module of said plurality of modules establishes a conditional variable;
said at least one initialization sequence comprises a plurality of initialization sequences; and
said method further comprises selecting one of said plurality of initialization sequences based on said conditional variable.

24. The method of claim 23 wherein said conditional variable is set based at least in part on the presence of one or more markers in a memory.

25. The method of claim 23 wherein said conditional variable is set based at least in part on a state of one or more hardware fuses.

26. A program storage device readable by a machine, embodying a program of instructions executable by the machine to perform a method for designing a software program comprising a plurality of modules, the method comprising:
defining at least one initialization sequence wherein each module of said plurality of modules is initialized according to a predetermined order;
defining calling order constraints wherein a first module may call a second module if said first module succeeds said second module in said predetermined order; and
creating a program specification for said software program, said program specification comprising a module specification for each module of said plurality of modules, said module specification indicating other modules called by an implementation of said module.

27. The program storage device of claim 26 wherein at least one of said plurality of modules comprises an initialization procedure to be called once before any other procedure in the same module is called.

28. The program storage device of claim 26 wherein said method further comprises determining whether said program specification is consistent with said initialization sequence and said calling order constraints.

29. The program storage device of claim 28 wherein said method further comprises modifying said program specification to make said program specification consistent with said initialization sequence and said calling order constraints if said program specification is inconsistent with said initialization sequence and said calling order constraints.

30. The program storage device of claim 26 wherein said method further comprises determining whether an implementation of said software program is consistent with said program specification, said program specification being consistent with said initialization sequence and said calling order constraints.

31. The program storage device of claim 26 wherein said method further comprises modifying an implementation of said software program to make said implementation consistent with said program specification, said program specification being consistent with said initialization sequence and said calling order constraints.

32. The program storage device of claim 26 wherein said method further comprises:
    determining whether said program specification is consistent with said initialization sequence and said calling order constraints;
    determining whether an implementation of said software program is consistent with said program specification if said program specification is consistent with said initialization sequence and said calling order constraints; and
    modifying said implementation of said software program to make said implementation consistent with said program specification if said implementation is not consistent with said program specification.

33. The program storage device of claim 26 wherein said defining calling order constraints further comprises using at least one annotation in said software program to define said calling order constraints.

34. The program storage device of claim 26 wherein said method further comprises indicating an implementation of said program is consistent if said implementation is consistent with said program specification and if said program specification is consistent with said initialization sequence and said calling order constraints.

35. The program storage device of claim 26 wherein said software program includes a boot manager module, said boot manager module configured to be the first module of said program to execute upon execution of said software program.

36. The program storage device of claim 26 wherein at least one of said plurality of modules is assigned to one of at least one layer of a plurality of software module layers.

37. The program storage device of claim 36 wherein said method further comprises organizing said plurality of modules in said plurality of software module layers into two or more columns of related functionality.

38. The program storage device of claim 36 wherein said plurality of software module layers comprises three software module layers.

39. The program storage device of claim 36 wherein said plurality of software module layers comprises four software module layers.

40. The program storage device of claim 26 wherein at least part of said specification is embedded within said implementation.

41. The program storage device of claim 40 wherein at least one annotation including a calling order of a plurality of modules is embedded within said implementation.

42. The program storage device of claim 26 wherein said software program is targeted for execution on a resource-constrained device.

43. The program storage device of claim 42 wherein said software program is targeted for execution on a smart card.

44. The program storage device of claim 43 wherein said software program is targeted for execution on a Java Card™ technology-enabled smart card.

45. The program storage device of claim 26 wherein said initialization sequence terminates with the execution of a command interpreter.

46. The program storage device of claim 26 wherein said initialization sequence terminates with the execution of a Java Card™ Runtime Environment (JCRE).

47. The program storage device of claim 26 wherein said initialization sequence terminates with the execution of a virtual machine (VM).

48. The program storage device of claim 26 wherein
    at least one of module of said plurality of modules establishes a conditional variable;
    said at least one initialization sequence comprises a plurality of initialization sequences; and
    said method further comprises selecting one of said plurality of initialization sequences based on said conditional variable.

49. The program storage device of claim 48 wherein said conditional variable is set based at least in part on the presence of one or more markers in a memory.

50. The program storage device of claim 48 wherein said conditional variable is set based at least in part on a state of one or more hardware fuses.

51. An apparatus for designing a software program comprising a plurality of modules, the apparatus comprising:
    means for defining at least one initialization sequence wherein each module of said plurality of modules is initialized according to a predetermined order;
    means for defining calling order constraints wherein a first module may call a second module if said first module succeeds said second module in said predetermined order; and
    means for creating a program specification for said software program, said program specification comprising a module specification for each module of said plurality of modules, said module specification indicating other modules called by an implementation of said module.

52. The apparatus of claim 51 wherein at least one of said plurality of modules comprises an initialization procedure to be called once before any other procedure in the same module is called.

53. The apparatus of claim 51, further comprising means for determining whether said program specification is consistent with said initialization sequence and said calling order constraints.

54. The apparatus of claim 53, further comprising means for modifying said program specification to make said program specification consistent with said initialization sequence and said calling order constraints if said program specification is inconsistent with said initialization sequence and said calling order constraints.

55. The apparatus of claim 51, further comprising means for determining whether an implementation of said software program is consistent with said program specification, said program specification being consistent with said initialization sequence and said calling order constraints.

56. The apparatus of claim 51, further comprising means for modifying an implementation of said software program to make said implementation consistent with said program specification, said program specification being consistent with said initialization sequence and said calling order constraints.

57. The apparatus of claim 51, further comprising:
means for determining whether said program specification is consistent with said initialization sequence and said calling order constraints;
means for determining whether an implementation of said software program is consistent with said program specification if said program specification is consistent with said initialization sequence and said calling order constraints; and
means for modifying said implementation of said software program to make said implementation consistent with said program specification if said implementation is not consistent with said program specification.

58. The apparatus of claim 51 wherein said defining calling order constraints further comprises means for using at least one annotation in said software program to define said calling order constraints.

59. The apparatus of claim 51, further comprising means for indicating an implementation of said program is consistent if said implementation is consistent with said program specification and if said program specification is consistent with said initialization sequence and said calling order constraints.

60. The apparatus of claim 51 wherein said software program includes a boot manager module, said boot manager module configured to be the first module of said program to execute upon execution of said software program.

61. The apparatus of claim 51 wherein at least one of said plurality of modules is assigned to one of at least one layer of a plurality of software module layers.

62. The apparatus of claim 61, further comprising means for organizing said plurality of modules in said plurality of software module layers into two or more columns of related functionality.

63. The apparatus of claim 61 wherein said plurality of software module layers comprises three software module layers.

64. The apparatus of claim 61 wherein said plurality of software module layers comprises four software module layers.

65. The apparatus of claim 51 wherein at least part of said specification is embedded within said implementation.

66. The apparatus of claim 65 wherein at least one annotation including a calling order of a plurality of modules is embedded within said implementation.

67. The apparatus of claim 51 wherein said software program is targeted for execution on a resource-constrained device.

68. The apparatus of claim 67 wherein said software program is targeted for execution on a smart card.

69. The apparatus of claim 68 wherein said software program is targeted for execution on a Java Card™ technology-enabled smart card.

70. The apparatus of claim 51 wherein said initialization sequence terminates with the execution of a command interpreter.

71. The apparatus of claim 51 wherein said initialization sequence terminates with the execution of a Java Card™ Runtime Environment (JCRE).

72. The apparatus of claim 51 wherein said initialization sequence terminates with the execution of a virtual machine (VM).

73. The apparatus of claim 51 wherein
at least one of module of said plurality of modules establishes a conditional variable;
said at least one initialization sequence comprises a plurality of initialization sequences; and
said apparatus further comprises means for selecting one of said plurality of initialization sequences based on said conditional variable.

74. The apparatus of claim 73, further comprising means for setting said conditional variable based at least in part on the presence of one or more markers in a memory.

75. The method of claim 73, further comprising means for setting said conditional variable based at least in part on a state of one or more hardware fuses.

76. An apparatus for analyzing a program specification, the apparatus comprising:
an initialization order constraint tool configured to receive a program specification for a software program, said program specification comprising a module specification for each module of said plurality of modules, said module specification indicating other modules called by an implementation of said module, said tool further configured to determine whether said program specification is consistent with respect to a calling order constraint, said calling order constraint indicating a first module may call a second module only if said first module is initialized after said second module is initialized.

77. An apparatus for analyzing a program implementation, the apparatus comprising:
an initialization order constraint tool configured to receive a program implementation for a software program, said program implementation comprising a plurality of modules, said tool further configured to determine whether said program specification is consistent with respect to a calling order constraint, said calling order constraint indicating a first module may call a second module only if said first module is initialized after said second module is initialized.

78. An apparatus for analyzing a program, the apparatus comprising:
an initialization order constraint tool configured to receive a program specification for a software program and a program implementation for said software program, said program specification comprising a module specification for each module of said plurality of modules, said module specification indicating other modules called by an implementation of said module, said program implementation comprising said plurality of modules, said tool further configured to determine whether said program implementation is consistent with respect to said program specification, said program specification following a calling order constraint that provides a first module may call a second module only if said first module is initialized after said second module is initialized.

79. The apparatus of claim 78 wherein said apparatus is further configured to modify said program implementation to make said program implementation consistent with said program specification if said program implementation is inconsistent with respect to said program specification.

80. An apparatus for deployment of high integrity software, the apparatus comprising:
a hardware component comprising:

a processor;

a memory coupled to said processor; and a reset indicator coupled to said processor;

a kernel component comprising a plurality of modules having at least one defined initialization sequence wherein each module of said plurality of modules is initialized according to a predetermined order, said plurality of modules having defined calling order constraints wherein a first module may call a second module if said first module succeeds said second module in said predetermined order, the first module in said initialization sequence operatively coupled to said reset indicator; and a main component comprising at least one module, said at least one module executed after initialization of said kernel component.

81. The apparatus of claim 80 wherein at least one of said plurality of modules is assigned to at least one layer of a plurality of software module layers.

82. The apparatus of claim 81 wherein said plurality of modules is organized into two or more columns of related functionality.

83. The apparatus of claim 81 wherein said plurality of module layers comprises three software module layers.

84. The apparatus of claim 81 wherein said plurality of module layers comprises four software module layers.

85. The apparatus of claim 81 wherein said device comprises a resource-constrained device.

86. The apparatus of claim 85 wherein said apparatus comprises a smart card.

87. The apparatus of claim 85 wherein said apparatus comprises a Java Card™ technology-enabled smart card.

88. The apparatus of claim 87 wherein said main component comprises a Java Card™ Runtime Environment (JCRE).

89. The apparatus of claim 80 wherein said main component comprises a command interpreter.

90. The apparatus of claim 80 wherein said processor comprises a virtual machine.

91. The apparatus of claim 80 wherein said at least one defined initialization sequence comprises a plurality of initialization sequences, at least one of said plurality of initialization sequences associated with an operational mode based on the presence of one or more markers in said memory.

92. The apparatus of claim 80 wherein said apparatus further comprises a hardware abstraction component comprising a virtual machine configured to execute instructions in said kernel component; and said first module in said initialization sequence is operatively coupled to said reset indicator via said virtual machine.

* * * * *